(12) United States Patent
Hung et al.

(10) Patent No.: US 10,134,050 B1
(45) Date of Patent: Nov. 20, 2018

(54) METHOD AND SYSTEM FOR FACILITATING THE PRODUCTION OF ANSWER CONTENT FROM A MOBILE DEVICE FOR A QUESTION AND ANSWER BASED CUSTOMER SUPPORT SYSTEM

(71) Applicant: Intuit Inc., Mountain View, CA (US)

(72) Inventors: Kelvin Hung, San Diego, CA (US); Igor A. Podgorny, San Diego, CA (US); Matthew Cannon, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 501 days.

(21) Appl. No.: 14/699,072

(22) Filed: Apr. 29, 2015

(51) Int. Cl.
*G06Q 30/02* (2012.01)
*G06Q 40/00* (2012.01)

(52) U.S. Cl.
CPC ....... *G06Q 30/0203* (2013.01); *G06Q 40/123* (2013.12)

(58) Field of Classification Search
CPC ...... G06Q 10/00; G06Q 401/06; G06Q 40/06; G06F 17/60
USPC ....................................... 705/7.32
See application file for complete search history.

(56) References Cited

U.S. PATENT DOCUMENTS

| 5,471,382 | A | 11/1995 | Tallman et al. |
| 5,519,608 | A | 5/1996 | Kupiec |
| 6,147,975 | A | 11/2000 | Bowman-Amuah |
| 7,013,263 | B1 | 3/2006 | Isaka et al. |
| 7,222,078 | B2 | 5/2007 | Abelow |
| 7,385,716 | B1 | 6/2008 | Skaanning |
| 7,594,176 | B1 | 9/2009 | English |
| 7,685,144 | B1 | 3/2010 | Katragadda |
| 7,974,860 | B1 | 7/2011 | Travis |

(Continued)

FOREIGN PATENT DOCUMENTS

| CN | 101520802 | 4/2009 |
| EP | 2159715 | 3/2010 |
| WO | WO 2011/053830 | 5/2011 |

OTHER PUBLICATIONS

Bartolome et al., "Processing Unstructured Voice of Customer Feedback for Improving Content Rankings in Customer Support Systems," U.S. Appl. No. 15/094,653, filed Apr. 8, 2016.

(Continued)

*Primary Examiner* — Romain Jeanty
(74) *Attorney, Agent, or Firm* — Hawley Troxell Ennis & Hawley LLP; Philip McKay

(57) ABSTRACT

Reduction in latency between question submissions and response submissions in a question and answer based customer support system is reduced by facilitating the use of mobile devices by customer support personnel to submit question responses. The answerability of a question from a mobile device is predicted by pre-submission parsing and analysis of the attributes of the question before the answer is generated. Questions being entered into the question and answer based customer support system that are conveniently answerable from a mobile device are routed to a mobile question and answer queue that enables mobile device users to review and respond to the mobile device answerable questions. The user interface for the mobile device is configured/customized based on the attributes/content/analysis of the question to enable customer support personnel to more quickly respond to question submissions.

28 Claims, 12 Drawing Sheets

(56) References Cited

U.S. PATENT DOCUMENTS

| | | | | |
|---|---|---|---|---|
| 8,943,145 | B1* | 1/2015 | Peters | G06Q 50/01 709/206 |
| 9,015,031 | B2 | 4/2015 | Ferrucci et al. | |
| 9,063,983 | B1* | 6/2015 | Lee | G06F 17/3051 |
| 9,582,757 | B1 | 2/2017 | Holmes et al. | |
| 9,633,309 | B2 | 4/2017 | Giffels et al. | |
| 2002/0111926 | A1 | 8/2002 | Bebie | |
| 2002/0123983 | A1 | 9/2002 | Riley et al. | |
| 2002/0169595 | A1 | 11/2002 | Agichtein et al. | |
| 2003/0099924 | A1 | 5/2003 | Tsuboi et al. | |
| 2004/0024739 | A1 | 2/2004 | Copperman et al. | |
| 2005/0114327 | A1 | 5/2005 | Kumamoto et al. | |
| 2006/0265232 | A1* | 11/2006 | Katariya | G06Q 30/016 705/304 |
| 2007/0011131 | A1 | 1/2007 | Delefevre | |
| 2007/0259325 | A1* | 11/2007 | Clapper | G09B 5/14 434/350 |
| 2008/0215541 | A1 | 9/2008 | Li et al. | |
| 2008/0294637 | A1 | 11/2008 | Liu | |
| 2009/0012926 | A1 | 1/2009 | Ishikawa et al. | |
| 2009/0162824 | A1* | 6/2009 | Heck | G06N 3/004 434/322 |
| 2009/0248659 | A1 | 10/2009 | McCool et al. | |
| 2009/0253112 | A1 | 10/2009 | Cao et al. | |
| 2009/0265340 | A1 | 10/2009 | Barcklay et al. | |
| 2010/0068687 | A1 | 3/2010 | Bertelsen | |
| 2010/0070554 | A1 | 3/2010 | Richardson et al. | |
| 2010/0076998 | A1 | 3/2010 | Podgorny et al. | |
| 2010/0185630 | A1 | 7/2010 | Cheng et al. | |
| 2010/0191686 | A1 | 7/2010 | Wang et al. | |
| 2010/0203492 | A1 | 8/2010 | Nibe et al. | |
| 2010/0205550 | A1 | 8/2010 | Chen et al. | |
| 2010/0235361 | A1 | 9/2010 | Chandran et al. | |
| 2011/0125734 | A1 | 5/2011 | Duboue et al. | |
| 2011/0202472 | A1 | 8/2011 | Wan et al. | |
| 2011/0231347 | A1 | 9/2011 | Xu et al. | |
| 2011/0264569 | A1 | 10/2011 | Houseworth et al. | |
| 2012/0005148 | A1 | 1/2012 | Horvitz et al. | |
| 2012/0005219 | A1 | 1/2012 | Apacible et al. | |
| 2012/0022983 | A1 | 1/2012 | Hughes et al. | |
| 2012/0084293 | A1 | 4/2012 | Brown et al. | |
| 2012/0130910 | A1 | 5/2012 | Al-Alami | |
| 2012/0130978 | A1 | 5/2012 | Li et al. | |
| 2012/0166438 | A1 | 6/2012 | Wu et al. | |
| 2012/0219142 | A1 | 8/2012 | Gould | |
| 2012/0233191 | A1 | 9/2012 | Ramanujam | |
| 2012/0331052 | A1 | 12/2012 | Rathod | |
| 2013/0019286 | A1 | 1/2013 | Barborak et al. | |
| 2013/0054497 | A1* | 2/2013 | Garland | G06N 99/005 706/12 |
| 2013/0066693 | A1 | 3/2013 | Laird-McConnell et al. | |
| 2013/0073390 | A1 | 3/2013 | Konig et al. | |
| 2013/0282363 | A1 | 10/2013 | Fan et al. | |
| 2013/0304730 | A1 | 11/2013 | Zhou | |
| 2013/0325992 | A1 | 12/2013 | McGann et al. | |
| 2013/0339870 | A1 | 12/2013 | Tandra Sishtla et al. | |
| 2014/0006012 | A1 | 1/2014 | Zhou et al. | |
| 2014/0088944 | A1 | 3/2014 | Natarajan et al. | |
| 2014/0119531 | A1 | 5/2014 | Tuchman et al. | |
| 2014/0189829 | A1 | 7/2014 | McLachlan et al. | |
| 2014/0222669 | A1 | 8/2014 | Novak et al. | |
| 2014/0308648 | A1 | 10/2014 | Jain | |
| 2014/0316856 | A1 | 10/2014 | Williams et al. | |
| 2014/0337257 | A1 | 11/2014 | Chatterjee et al. | |
| 2015/0052087 | A1 | 2/2015 | Srinivasan et al. | |
| 2015/0095267 | A1 | 4/2015 | Behere et al. | |
| 2015/0120718 | A1 | 4/2015 | Luo et al. | |
| 2015/0127587 | A1 | 5/2015 | Pinckney et al. | |
| 2015/0139415 | A1 | 5/2015 | Skiba et al. | |
| 2015/0254785 | A1 | 9/2015 | Yang | |
| 2015/0371137 | A1* | 12/2015 | Giffels | G06N 5/02 706/46 |
| 2016/0048772 | A1 | 2/2016 | Bruno et al. | |
| 2016/0055234 | A1 | 2/2016 | Visotski et al. | |
| 2016/0103833 | A1 | 4/2016 | Sanders et al. | |
| 2016/0189029 | A1 | 6/2016 | Giffels et al. | |
| 2016/0196497 | A1 | 7/2016 | Allen et al. | |
| 2016/0217472 | A1 | 7/2016 | Podgorny et al. | |
| 2016/0283491 | A1 | 9/2016 | Lu et al. | |
| 2016/0306846 | A1 | 10/2016 | Adams, Jr. et al. | |
| 2017/0032251 | A1 | 2/2017 | Podgorny et al. | |
| 2017/0032468 | A1 | 2/2017 | Wang et al. | |
| 2017/0124184 | A1 | 5/2017 | Podgorny et al. | |
| 2018/0032890 | A1 | 2/2018 | Podgorny et al. | |

OTHER PUBLICATIONS

Podgorny, et al., "Content Quality and User Ranking in TurboTax AnswerXchange," Proceedings of the European Conference on Social Media, University of Brighton UK, Jul. 10-11, 2014.

The Scientific Marketer, "Uplift Modelling FAQ", article date of Sep. 27, 2007, retrieved from http://scientificmarketer.com/2007/09/uplift-modelling-faq.html (Year: 2007).

Zadeh, Z.; "Probabilistic Modeling in Community-Based Question Answering Services," Dalhousie University, Halifax, Nova Scotia; Feb. 2012.

Podgorny, et al. "Real Time Detection and Intervention of Poorly Phrased Questions," CHI EA '15, Proceedings of the 33rd Annual ACM Conference Extended Abstracts on Human Factors in Computing Systems, Apr. 18-23, 2015, Seoul, Republic of Korea, pp. 2205-2210.

Get Satisfaction [online]. Sprinklr, 2017 [retrieved on Nov. 11, 2017]. Retrieved from the Internet: <URL: https://getsatisfaction.com/corp>.

* cited by examiner

| | 101 | 102 | 103 |
|---|---|---|---|
| TYPE/FORMAT OF QUESTION | OCCURRENCE PERCENTAGE (%) | SATISFIED WITH ANSWER (%) |
| CLOSED-ENDED (Yes/No or Multpile choice) | 28.1 | 85.9 |
| WHO (Person) | 1.6 | 81.4 |
| WHAT (Thing or object) | 9.7 | 73.1 |
| WHERE (Position or place) | 8.6 | 70.2 |
| WHEN (Time or occasion) | 5.5 | 68.2 |
| ILL-FORMED (Search Query) | 28.7 | 66.8 |
| HOW (Way or form) | 21.6 | 66.4 |
| WHY (Reason or explanation) | 7.5 | 56.3 |

FIG. 1A

| MODEL ATTRIBUTE | WALD CHI-SQUARE |
|---|---|
| "CLOSED-ENDED" TYPE | (+) 339 |
| "WHY" TYPE | (−) 317 |
| REPORTING A PROBLEM | (−) 180 |
| "HOW" TYPE | (−) 105 |
| INTENT TO CALL/CHAT | (−) 104 |
| SUBJECT LENGTH | (+) 87 |
| SOFTWARE RELATED | (−) 77 |
| PERSONAL PRONOUN "YOU" | (−) 75 |
| INTENT TO PRINT TAX RETURN | (−) 66 |
| QUESTION MARK IN QUESTION | (+) 59 |

FIG. 1C

Ask a multiple-choice question (recommended):

Can, are, do, does, if, is, should, will...

Answer choices:
⦿ Yes or No
○ Let me specify...

−or−

Ask an open-ended question:

Where, what, when, who, how...

FIG. 2A

QUESTION OPTIMIZER

Get better answers!
Can you rephrase "Why can't I print?"

BEST: Ask it as a multiple choice question

Can, are, do, does, if, is, should, will, which...

Be concise. You can add details next    15 more characters required

Answer choices:
This will help you get the answer you need,
but will not prevent people from adding detailed answers.
⦿ Yes or No
○ Let me specify...

GOOD: Ask it as an open-ended question

Where, what, when, who, how...

Be concise. You can add details next    15 more characters required

Skip    Submit optimized question

FIG. 2B

METHOD AND SYSTEM FOR FACILITATING THE PRODUCTION OF ANSWER CONTENT FROM A MOBILE DEVICE FOR A QUESTION AND ANSWER BASED CUSTOMER SUPPORT SYSTEM

BACKGROUND

Software applications and systems have become indispensable tools for helping consumers, i.e., users, perform a wide variety of tasks in their daily professional and personal lives. Currently, numerous types of desktop, web-based, and cloud-based software systems are available to help users perform a plethora of tasks ranging from basic computing system operations and word processing, to financial management, small business management, tax preparation, health tracking and healthcare management, as well as other personal and business endeavors, operations, and functions far too numerous to individually delineate here.

One major, if not determinative, factor in the utility, and ultimate commercial success, of a given software system of any type is the ability to implement and provide a customer support system through which a given user can obtain assistance and, in particular, get answers to questions that arise during the installation and operation of the software system. However, providing potentially millions of software system users with specialized advice and answers to their specific questions is a huge undertaking that can easily, and rapidly, become economically infeasible.

To address this problem, many providers of software systems implement or sponsor one or more question and answer based customer support systems. Typically, a question and answer based customer support system includes a hosted forum through which a user can direct their specific questions, typically in a text format, to a support community that often includes other users and/or professional support personal.

In many cases, once a user's specific question is answered by one or more members of the support community through the question and answer based customer support system, the user's specific question, and the answer to the specific question provided by the support community, is categorized and added to a customer support question and answer database associated with the question and answer based customer support system. In this way, subsequent users of the software system can access the user's specific question or topic, and find the answer to the user's question, via a search of the customer support question and answer database. As a result, a dynamic customer support question and answer database of categorized/indexed user questions and answers is made available to users of the software system through the question and answer based customer support system.

The development of customer support question and answer databases has numerous advantages including a self-help element whereby a searching user, i.e., a user accessing the resulting question and answer pair, can find an answer to their particular question by simply searching the customer support question and answer database for topics, questions, and answers related to their issue. In addition, if the answer to the user's specific question is not in the customer support question and answer database, the user can then become an asking user by submitting their question to the question and answer based customer support system, typically through the same web-site and/or user interface. Consequently, by using a question and answer based customer support system that includes a customer support question and answer database, potentially millions of user questions can be answered in an efficient and effective manner, and with minimal duplicative effort.

Although providing a customer support question and answer database can be a selling point for using/choosing a particular service provider, a system that provides a very delayed/late answer, can be perceived as being as useless as providing no answer at all. In currently available question and answer based customer support systems, once an asking user's question is submitted, the question is stored in the system while waiting to be answered. With millions of users seeking for answers and submitting new questions, unanswered questions in a customer support system can easily and rapidly grow to hundreds, thousands, and even tens of thousands of unanswered questions. Some of the existing question and answer based customer support systems rely on hundreds, if not thousands, of volunteers to submit responses to the unanswered questions in the customer support system. Because volunteers, by their nature, respond to unanswered questions at their leisure or at their convenience, a growth of unanswered questions may be indicative of a question and answer support system that is inadequately catering to the needs of the volunteers.

What is needed is a method and system for facilitating the production of answer content from mobile devices by customer support personnel for questions submitted to a question and answer based customer support system, to reduce the latency between question submission and answer submission, to improve utilization of customer support personnel availabilities, and/or to reduce the number of unanswered questions in a queue for the question and answer based customer support system.

SUMMARY

Embodiments of the present disclosure address some of the shortcomings associated with traditional question and answer based customer support systems by facilitating the production of answer content from mobile devices by customer support personnel for questions submitted to a question and answer based customer support system, to reduce the latency between question submission and answer submission, to improve utilization of customer support personnel availabilities, and/or to reduce the number of unanswered questions in a queue for the question and answer based customer support system. Customer support personnel include employees and volunteers. The volunteer customer support personnel are extremely valuable in that they: build goodwill for the service provider, are unfunded, and/or provide potentially unlimited/unconstrained response times or "office hours". The volunteer customer support personnel respond to customer support questions out of a motivation other than to fulfill job requirements/receive a paycheck, and they do so at their leisure and convenience. The disclosed customer support system provides support to the volunteer customer support personnel in order to: enable volunteers to conveniently reply to questions using their mobile devices, increase the speed by which the volunteers can respond to questions, and/or decrease the amount of typing needed by the volunteers to respond to questions, according to one embodiment.

The disclosed question and answer based customer support system analyzes a question, determines if the question is suitable/convenient for response on a mobile device, and configures the user interface elements of the user interface on the mobile device based on the analysis of the question, to make it easier (if possible) for the customer support personnel (e.g., the volunteers) to respond to the question, according to one embodiment. In one embodiment, for closed-ended questions (e.g., binary choice or multiple choice), the question answer based customer support system configures the user interface elements with buttons that the customer support personnel can use to answer the question. For example, if the question and answer based customer support system determines that a question is a "Yes/No" question, the question and answer based customer support system pre-populates the user interface with a button that is labeled "Yes" and with a button that is labeled "No", to enable the customer support personnel to respond to the question with a simple click/touch of a button. If the question and answer based customer support system determines that a question is a multiple-choice question, the question and answer based customer support system parses the question to determine the response options for the question and pre-populates the user interface with buttons that are labeled with those response options, e.g., "TurboTax Free" and "TurboTax Deluxe", according to one embodiment. Because many of the customer support personnel volunteers already respond to questions during leisure or available time, facilitating question responses via mobile devices can increase the quantity and decrease the response times to questions submitted to the question and answer based customer support system, according to one embodiment. By pre-populating the mobile device user interfaces, the question answer based customer support system can increase the volume of responses provided by customer support personnel within a given time (i.e., increase the response rate), to take advantage of the precious resource of volunteer hours contributed to assist customers and/or tax filers who are seeking for tax-related assistance, according to one embodiment. If a customer submits a question to a customer support help forum, with the expectation of receiving assistance, then the customer may be unhappy with the service provider when the customer does not receive a timely (within days or weeks) response. On the other hand, if a customer receives a helpful response to a submitted question in a timely manner and/or before the customer seeks the answer elsewhere, the customer is likely to attribute his/her gratitude towards the service provider, thus building additional goodwill for the service provider. Furthermore, users who are seeking answers can see the difference between a question submission date and a question response date, and general users of the question and answer based customer service system may place less value on the customer support service when it is apparent that a significant lag exists between question submission and question response. Accordingly, the disclosed systems and methods for facilitating the production of answer content from mobile devices by customer support personnel for questions submitted to a question and answer based customer support system solves a business need to provide timely responses to customers and potential customers, even though the number of questions submitted to the service may exceed the response capacity of the service provider's paid employees.

Prior to routing any questions to the customer support personnel, the question and answer based customer support system performs an initial analysis on the question being asked. In this way, the question is analyzed and/or proactively modified to facilitate response generation, facilitate question understandability by the customer support personnel, decrease response time latency, improve answer content, and/or increase the probability of user satisfaction with potential answers that may, or may not, eventually be provided through the question and answer based customer support system. In one embodiment, the processing, analysis, and transformation/modification are performed before any resources are actually devoted to generating and providing the answer content.

In one embodiment, the method and system for facilitating the production of answer content from mobile devices by customer support personnel for questions submitted to a question and answer based customer support system includes performing pre-question submission parsing of the question content data and analysis of the attributes of the question, to predict the answerability of the questions from a mobile device. Examples of attributes of the question include, but are not limited to, type, subject matter, category, estimated response length, and format, according to one embodiment. In one embodiment, the answerability of a question from a mobile device is determined based on multiple attributes of a question, such as predicted length of the answer, whether it is predicted that the answer will include one or more web links, and/or whether it is predicted that the user can respond to the question without performing research. One or more predictive models are trained using one or more years of existing question and answer data to determine estimates/predictions of the answer length, whether the answer will include a web link, and/or whether a user will have to perform research to answer the question, according to one embodiment.

In one embodiment, questions that are determined to be suitable for or answerable from a mobile device are routed to a mobile question and answer queue in a question and answer database that is within the question and answer based customer support system. The question and answer based customer support system sorts and/or filters questions in the question and answer database, so that customer support personnel using mobile devices are optionally able to receive, view, and/or access the mobile device answerable questions before being presented with more difficult or challenging questions, according to one embodiment.

Using the concepts disclosed herein, the answerability of questions from a mobile device is predicted before the question is formally submitted to the question and answer based customer support system. If the question is deemed answerable from a mobile device, the question is prioritized for presentation to mobile devices for customer support personnel, and the user interface elements for the mobile device are configured/customized based on an analysis of the question, according to one embodiment. In one embodiment, the user interface elements include buttons with pre-populated answers for the customer support personnel to choose from when responding to the question. In this manner, there is a higher likelihood that the question will be understood and conveniently answered by volunteer customer support personnel throughout the day with their mobile devices to enable volunteer customer support personnel to spend more parts of the day managing and/or reducing the quantity of unanswered questions in a question and answer queue.

The disclosed method and system for facilitating the production of answer content from mobile devices by customer support personnel for questions submitted to a question and answer based customer support system provides for significant improvements to the technical fields of customer support, information dissemination, software implementation, and user experience. In addition, using the disclosed method and system for facilitating the production of answer content from mobile devices by customer support personnel for questions submitted to a question and answer based customer support system results in more efficient use of human and non-human resources, fewer processor cycles being utilized, reduced memory utilization, and less communications bandwidth being utilized to relay data to and from backend systems. As a result, computing systems are transformed into faster, more efficient, and more effective computing systems by implementing the method and system for facilitating the production of answer content from mobile devices by customer support personnel for questions submitted to a question and answer based customer support system disclosed herein.

BRIEF DESCRIPTION OF THE DRAWINGS

FIG. 1A shows a table of results data obtained through analysis of actual questions submitted to a question and answer based customer support system indicating question types, the frequency of the question types as a percentage of questions asked, and ranking of the question types by up vote fraction;

FIG. 1C is a table of results data obtained through analysis of actual questions submitted to a question and answer based customer support system showing the Wald Chi-square statistics for the top subject attributes of a user vote prediction model;

FIG. 2A is an illustrative example of a first question transformation interface screen used to provide users format transformation/question reformation instructions that direct users in transforming improperly formatted questions into properly formatted closed-ended questions in accordance with one embodiment;

FIG. 2B is an illustrative example of a second question transformation interface screen used to provide users format transformation/question reformation instructions and using a question optimizer approach to direct users towards transforming improperly formatted questions into properly formatted questions in accordance with one embodiment;

Figure 1B:
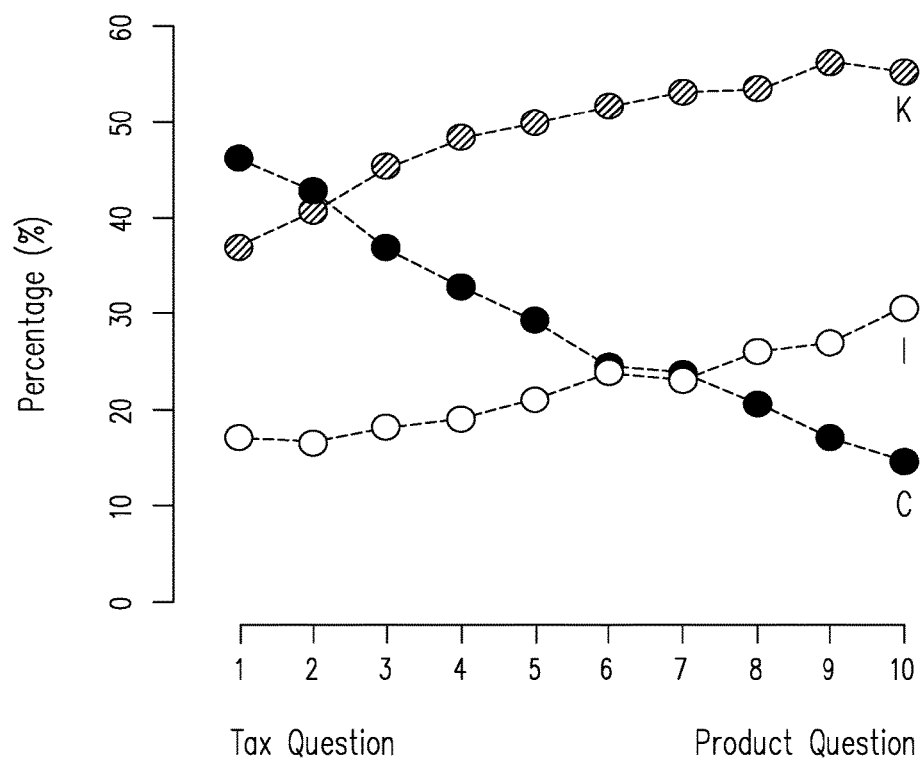
FIG. 1B is a graph of results data obtained through analysis of actual questions submitted to a question and answer based customer support system showing the discovered relationship between "subject matter questions," "product related questions," and the category of question asked.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

TERM DEFINITIONS

Herein, a software system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers/obtains data, from one or more sources and/or has the capability to analyze at least part of the data.

As used herein, the term software system includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of software systems include, but are not limited to the following: TurboTax™ available from Intuit, Inc. of Mountain View, Calif.; TurboTax Online™ available from Intuit, Inc. of Mountain View, Calif.; Quicken™, available from Intuit, Inc. of Mountain View, Calif.; Quicken Online™, available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the terms "mobile computing system" and "mobile device" are used interchangeably and include, but are not limited to the following: a smart phone; a cellular phone; a digital wireless telephone; a tablet computing system; a notebook computing system; any portable computing system; a two-way pager; a Personal Digital Assistant (PDA); a media player; an Internet appliance; devices worn or carried by a user; or any other movable/mobile device and/or computing system that includes components that can execute all, or part, of any one of the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user experience display" includes not only data entry and question submission user interfaces, but also other user experience features provided or displayed to the user such as, but not limited to the following: data entry fields; question quality indicators; images; backgrounds; avatars; highlighting mechanisms; icons; and any other features that individually, or in combination, create a user experience, as discussed herein, and/or as known in the art at the time of filing, and/or as developed after the time of filing.

As used herein, the term "question quality indicator" includes any mechanism, means, or feature/function provided to indicate to a user a determined quality of a question being provided by the user. Specific examples of question quality indicators include, but are not limited to, meter displays; line displays; score displays; audio content; visual content; images; backgrounds; avatars; highlighting mechanisms; icons; and any other features that individually, or in combination, relay to a user a determined quality of a question being submitted.

Herein, the term "party," "user," "user consumer," and "customer" are used interchangeably to denote any party and/or entity that interfaces with, and/or to whom information is provided by, the method and system for facilitating the production of answer content from mobile devices by customer support personnel for questions submitted to a question and answer based customer support system described herein, and/or a person and/or entity that interfaces with, and/or to whom information is provided by, the method and system for facilitating the production of answer content from mobile devices by customer support personnel for questions submitted to a question and answer based customer support system described herein, and/or a legal guardian of person and/or entity that interfaces with, and/or to whom information is provided by, the method and system for facilitating the production of answer content from mobile devices by customer support personnel for questions submitted to a question and answer based customer support system described herein, and/or an authorized agent of any party and/or person and/or entity that interfaces with, and/or to whom information is provided by, the method and system for facilitating the production of answer content from mobile devices by customer support personnel for questions submitted to a question and answer based customer support system described herein. For instance, in various embodiments, a user can be, but is not limited to, a person, a commercial entity, an application, a service, and/or a computing system.

As used herein, the term "asking user" includes a user of a software system submitting a question to a question and answer based customer support system.

As used herein, the term "searching user" includes a user of a software system submitting a search query to a customer support question and answer database associated with a question and answer based customer support system.

As used herein, the term "responding user" includes a user of a software system submitting a response to a question for a question and answer based customer support system. In one embodiment, the term "response" is interchangeably used with the term "reply", and the term "responding user" is interchangeably used with the term(s) "replying user" and/or "answering user". In one embodiment, a "responding user", "replying user", and/or "answering user" is a user who submits an answer to a question and/or one who submits a comment to a question in the question and answer based customer support system.

Theory and Empirical Analysis

The embodiments disclosed herein were developed to incorporate theories and address relationships discovered through analysis of data collected from a specific question and answer based customer support system implemented by Intuit™ Inc. of Mountain View, Calif. The specific question and answer based customer support system through which the data was collected was the TurboTax™ AnswerXchange™ (AXC) question and answer based customer support system.

AXC is a social question and answer based customer support system providing support for TurboTax™ customers and also serving as a discussion forum in the area of US Federal and State taxation. AXC is also used to generate reusable content for TurboTax™ user searches, i.e., to create a customer support question and answer database for TurboTax™ users. In fact, only 1.5% of AXC users are asking users who actually submit questions, while the remaining searching users look for answers by searching a customer support question and answer database provided through AXC.

AXC includes a support community of customer support personnel. In one embodiment, questions submitted to AXC are answered by members of the support community of customer support personnel. In one embodiment, the customer support personnel include paid professional support personnel in the employ of Intuit™ and volunteer, often non-paid, expert users of the TurboTax™ software system. In one embodiment, the volunteer expert users of the TurboTax™ software system are identified and certified by Intuit™.

Questions submitted to AXC were formulated in a variety of ways and directed to various broad categories. As one example, some questions were "product related questions", e.g., questions related to pricing, installation, version choice, etc. of the TurboTax™ software system that often had little or no relation to the subject matter/endeavor supported by the TurboTax™ software system, i.e., tax preparation. On the other hand, some questions were "subject matter related," or substantive questions, directly related to the subject matter/endeavor supported by the TurboTax™ software system, i.e., Federal and State taxation and tax preparation.

As an example, the questions "What version of TurboTax™ should I use?" or "How do I install TurboTax™ ?"

would be product related questions while the questions "Can I deduct my computer?" or "What is my adjusted gross income?" would be subject matter related questions. As discussed below, it was empirically determined that, in general, product related questions are best answered by paid support personnel in the employ of Intuit™ while subject matter related questions are often best answered by volunteer expert users.

Similar to other question and answer based customer support systems, AXC measures the quality of content, and answer content in particular, by collecting statistics of up and down votes directed to answer content provided by the asking users and searching users where an up vote indicates user satisfaction with the answer to the question and a down vote indicates user dissatisfaction with the answer to the question.

At the same time, the AXC questions were not ranked or judged based on quality of content beyond user satisfaction ratings, unless the question was determined as inappropriate and blocked from AXC. Therefore, user satisfaction with answer content in AXC typically would be derived from user votes alone thus providing a useful metric for answer quality. For example, this approach was applied to predicting answer satisfaction in AXC based on the one or more attributes of the question and answer combined with one or more AXC users' attributes. On the other hand, as disclosed herein, a recent analysis of AXC vote statistics found that answer quality/satisfaction is largely predetermined by the question subject matter, and/or type/format, and that users' satisfaction votes can be predicted with reasonable accuracy based on the attributes of the question alone. This finding provided a practical framework for "pro-active" detection of low-quality content at the question submission stage, i.e. before the question is even answered, and is the foundation of methods and systems for pro-actively improving answer content in a question and answer based customer support system and of methods and system for facilitating the production of answer content from mobile devices by customer support personnel for questions submitted to a question and answer based customer support system.

As noted above, questions submitted to AXC were formulated in a variety of ways and directed to various broad categories and subjects and in various question formats representing various question types. As one example, one user may ask "What version of TurboTax should I use?" Another user may ask "How do I install TurboTax?" Yet another user may ask "Can I deduct my computer?" It was determined that the optimal AXC design must be based on an empiric question taxonomy taking into account one or more of, the question category, the question format, the question grammar structure, the type of anticipated answer, asker type, and various other factors.

The Inventors began with general knowledge/open-ended question taxonomy. Specifically, the Inventors looked for "Wh- words" and "How" questions including interrogative pronouns such as "Who", "What", "When", "Where", "Why" and "How" used to compose general knowledge/open-ended category questions.

FIG. 1A is a table of results data obtained through the analysis of actual questions submitted to AXC. The table of FIG. 1A shows question types, also referred to herein as formats (column 101) of the 2014 AXC questions received, the frequency of the question types as a percentage of questions asked (column 102), and ranking of the question types/formats by up vote fraction (column 103) that are shown in FIG. 1A in the descending order. It is noted that the sum of up vote and down vote fractions can be equal to greater than 100% because some questions may belong to more than one type. As seen in FIG. 1A, when "Wh- words" analysis was applied to the AXC question subjects with question summaries limited to 255 characters, 54.5% of the questions received fell into the general knowledge/open-ended category.

One of the Inventors' goals was to separate question types/formats by the observed statistics relating up and down votes associated with the answers provided to each question types/formats. The result of this analysis is shown in FIG. 1A. Referring to FIG. 1A, note that "Why" formatted questions can often indicate mildly negative sentiment and often imply a rhetorical question, e.g., "Why is this so difficult?" or "Why is this taking so much time?" The Inventors postulate that this explains the lowest up vote fraction of 56.3% being associated with the "Why" question type/format in the general knowledge/open-ended category, as shown in FIG. 1A.

Next, the Inventors selected closed-ended category questions from the 56.8% of AXC questions that did not belong to the general knowledge/open-ended category. Most of the closed-ended type/format questions in AXC were in the sub-category of "Yes/No" type/format questions. These "Yes/No" type/format questions typically start with an auxiliary verb such as "Do", "Can", "Be." As indicated by the name, the "Yes/No" type/format questions can be answered by a "Yes" or "No" answer. A specific illustrative example of a "Yes/No" question would be: "Can I deduct my computer?" with the possible answers "Yes, you can" or "No, you can't."

The second sub-category of closed-ended question type/format includes "Choice" type/format questions. "Choice" type/format questions generally start with an auxiliary verb as well, but also contain the conjunction "or." Consequently, "Choice" type/format questions usually result in a multiple choice answer embedded in the body of the question. A specific illustrative example of a "Choice" type/format question would be "Should I install X or Y version?" with the possible answers "You need to install Y," "You need to install X," "You need to install either X or Y," "You need to install neither X or Y."

As seen in FIG. 1A, closed-ended type/format questions resulted in an impressive 85.9% up vote, i.e., 85.9% of users who submitted questions in the closed-ended format were satisfied with the answer provided. As seen in FIG. 1A, this was the highest satisfaction rating of all question types/formats. The high fraction of the up votes for the answers to the closed-ended type/format questions of in FIG. 1A is not surprising. Closed-ended type/format questions were typically long enough to provide sufficient context for answering, and were more likely to be subject matter related questions, as opposed to product related questions. As discussed below, subject matter related questions were channeled to volunteer expert users for answering and had a higher predicted likelihood of resulting in an up vote (see FIG. 1B discussed below).

Finally, if a question submitted to AXC was deemed to be neither a general knowledge/open-ended nor a closed-ended type/format question, the question was classified as being in the ill-formed question category by default. Most of the ill-formed category questions did not follow a grammatically correct question format either intentionally, e.g., search query type, or unintentionally, e.g., improper grammar, punctuation, etc., and were more difficult to answer. This, of course resulted in a higher probability of down vote from the users.

"How" and "Why" question types/formats were detectable with regular expressions analysis. Similarly "When", "Where" and "Who" question types/formats were detectable with regular expressions analysis but the analysis was slightly more involved as it typically required part-of-speech tagging to avoid confusion with relative adverbs and relative pronouns. However, as seen in FIG. 1A, these question types/formats were less common in AXC. More exotic question types/formats, such as "tag questions," "leading questions," and "embedded questions," were determined to be extremely rare in AXC and therefore were largely excluded from the Inventors' analysis.

FIG. 1B is a graph of results data obtained through analysis of actual questions submitted to AXC and showing the discovered relationship between: the percentage of up votes indicating user satisfaction with the answer provided (vertical axis), the category of question, e.g., "subject matter questions", or in the case of AXC, tax questions; "product related questions," or in the case of AXC TurboTax™ product questions; and the type/format of the question asked. The horizontal axis in FIG. 1B was divided into Deciles 1 to 10, with Decile 1 corresponding to well-defined subject matter related questions, and Decile 10 corresponding to well-defined product related questions. Consequently, FIG. 1B displays the satisfaction percentages of general knowledge/open-ended (K), closed-ended (C), and ill-formed questions types versus content type. In the Inventors' analysis, only voted upon, and therefore answered, questions were used to ensure the results reported/displayed in FIG. 1B that were consistent with the results reported/displayed in FIG. 1A.

FIG. 1C is a table of results data obtained through analysis of actual questions submitted to AXC showing the Wald Chi-square statistics for the top subject attributes of an AXC asking user vote prediction model. In FIG. 1C, the (+) and (−) signs indicate positive or negative correlation between attribute and up vote. As seen in FIG. 1C, closed-ended, "Why" and "How" question types are three out of the four most important model attributes. The third attribute, "Reporting a problem," was found to correlate with "Why" and "How" types. As noted above, "Why" questions are often rhetorical and may remain "unanswerable" unless the user provides further details.

Once the data of FIG. 1A, FIG. 1B, and FIG. 1C was obtained, an initial goal of correlating the different question types/formats with the observed statistics relating up and down votes associated with the answers provided to each question type/format was attained. Then three additional goals were identified: transforming "Why" and "How" type/format questions into to closed-ended type/format questions; transforming "unanswerable" questions into "answerable" questions; and transforming ill-formed questions into "well formed" questions.

With respect to the goal of transforming "Why" and "How" type/format questions into to closed-ended type/format questions, it was determined that the biggest positive and negative impacts on AXC user satisfaction came from the answers to closed-ended and "How/Why" type/format questions, respectively. While it is difficult to alter the broad category/subject of the question, e.g., switching user attention from product related questions to subject matter related questions, it was determined that it may be possible to transform the question type/format from a low quality format question, with a low predicted user satisfaction with any answer to the question, to a high quality format question, with a higher predicted user satisfaction with any answer to the question. For example, asking the user to re-phrase/transform a "Why" type/format question into a closed-ended type/format question.

With respect to the goal of transforming "unanswerable" questions into "answerable" questions, it was determined that the unanswerable questions were often formed as a statement without specific details. The task therefore involved a re-phrasing/transformation process similar to the process for transforming "Why" and "How" type/format questions into to closed-ended type/format questions, and also asking the user for more information.

With respect to the goal of transforming ill-formed questions into "well formed" questions, it was determined that re-phrasing/transforming ill-formed questions, e.g. making the questions more detailed and adding proper punctuation, may result in better answers. See FIG. 1B.

Figure 2C:
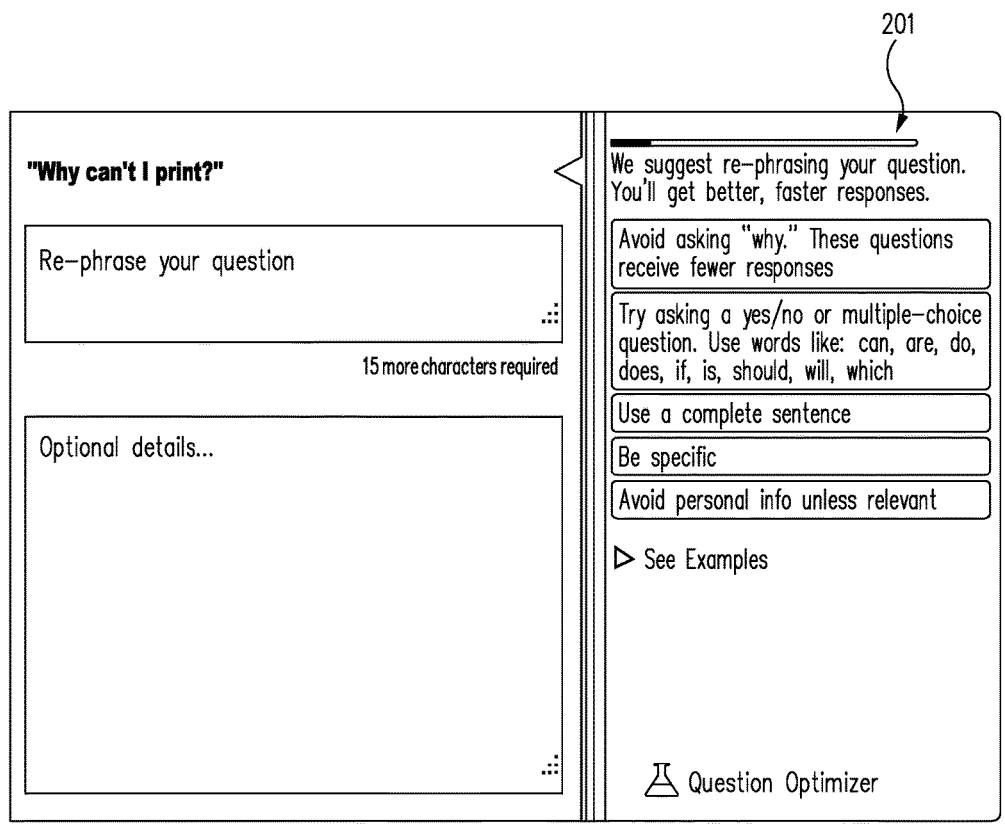
FIG. 2C is an illustrative example of a third question transformation interface screen used to provide users format transformation/question reformation instructions that direct users towards transforming improperly formatted questions into properly formatted questions and including a visual question quality indicator, which provides a simple read of question-quality in accordance with one embodiment.

To address these three goals, the Inventors designed and tested three question transformation user interface screens used to provide format transformation/question reformation instructions that direct users towards transforming improperly formatted questions into properly formatted closed-ended questions. The three question transformation user interface screens are shown in FIGS. 2A, 2B, and 2C, and are discussed separately below.

The first experience prototype, and associated question transformation interface screen, the Inventors explored is shown in FIG. 2A. The experience prototype, and associated question transformation interface screen, of FIG. 2A used constraints to direct users towards asking closed-ended questions, and went as far as defaulting to Yes/No answer types/formats. The experience prototype, and associated question transformation interface screen, of FIG. 2A emphasized closed-ended question types/formats, which yield the highest rated answers (see FIG. 1A). This approach was ultimately determined to be less than ideal because of the front-loaded cognitive overhead it created that forced users to think about their question type/format before they had a chance to even phrase it, and which ultimately proved too burdensome on the user.

It was found survey-style answer choices helped phrasing. For open-ended general knowledge/open-ended questions, the Inventors prompted with the most highly rated question-types/formats in order of effectiveness (see FIG. 1A), i.e.: "Where" type/format questions, "What" type/format questions, "When" type/format questions, "Who" type/format questions, and "How" type/format questions. The Inventors left out "Why" type/format questions since, as discussed above, "Why" type/format questions often lead to "unanswerable" or rhetorical questions.

The second experience prototype, and associated question transformation interface screen, the Inventors explored is shown in FIG. 2B and is referred to as the question optimizer approach. One example of one embodiment of the question optimizer approach is the Question Optimizer™ used by Intuit Inc. of Mountain View, Calif. The question optimizer experience prototype, and associated question transformation interface screen, of FIG. 2B allows the user to formulate/phrase a question first, then the user is provided the format transformation/question reformation instructions advising the user on how to re-phrase/transform an improperly formatted question into a properly formatted question. The question optimizer experience prototype, and associated question transformation interface screen, of FIG. 2B thus provides contextual cues to the user to help the user re-phrase the question in such a way as to achieve the highest predicted level of satisfaction with any answer to that question using the data of FIG. 1A. Using the one embodiment of the question optimizer experience prototype, and associated question transformation interface screen, of FIG. 2B, users are asked to retype their question rather than edit the question. Research confirmed that this approach helps the users re-phrase the question more effectively.

One advantage of the question optimizer experience prototype, and associated question transformation interface screen, approach of FIG. 2B is that initial question data inputs from the user can be analyzed pro-actively in real time. In most cases, the question type/format could be reliably detected from the first few characters/tokens/text of the question entered, as the question was being entered. The intervention accomplished through the question optimizer experience prototype, and associated question transformation interface screen, of FIG. 2B may therefore come at the very early stages of question formulation, alleviating the user's concern about accidentally losing the question before it is submitted to/recorded in the AXC customer support question and answer database.

To test the question optimizer experience prototype, and associated question transformation interface screen, approach of FIG. 2B, the Inventors used 40 AXC "Why" type/format questions belonging to the bottom 10% question quality. The study participants were Intuit™ employees and Peet's Coffee & Tea™ customers who were shown the "Why" formatted questions inside the question optimizer experience prototype, and associated question transformation interface screen, of FIG. 2B. Samples of the original and re-phrased questions are shown in the following Examples 1, 2 and 3.

Example 1—Transformation from "Why" Type/Format Question to "What" Type/Format Question Original Question: I don't understand why I can't efile"
Re-Phrased Question: "What steps do I need to take to efile?"

Example 2—Transformation from "Why" Type/Format Question to Closed-Ended Type/Format Question Original Question: "why is my debit card being declined"
Re-Phrased Question: "My Debit card has been declined. Is there something I need to do to make it work?"

Example 3:—Transformation from "Why" Type/Format Question to "How" Type/Format Question Original Question: "why does the program freeze up when I try to download a state?"
Re-Phrased Question: "When I try to download a stat the program is freezing. How can I fix it?"

The overall success rate of the question optimizer experience prototype, and associated question transformation interface screen, of FIG. 2B, i.e., the ability of the user to transform a "Why" type/format question to another, preferred, question type/format was 80%. What was especially encouraging is that some users were able to re-phrase "Why" type/format questions into closed-ended category questions (Example 2) while keeping the original intent of the question intact. This allows us to accomplish stated Goal 1, i.e., transforming "Why" and "How" type/formatted questions into to closed-ended category/formatted questions.

In addition, in most cases, the questions transformed/re-phrased using the question optimizer experience prototype, and associated question transformation interface screen, of FIG. 2B, became easier to understand and "answerable." This allows us to accomplish stated Goal 2, i.e., transforming "unanswerable" questions into "answerable" questions.

In addition, re-phrasing/transforming using the question optimizer experience prototype, and associated question transformation interface screen, of FIG. 2B, typically resulted in better formed/formatted questions compared to the original question, including proper spelling, grammar structure, capitalization and punctuation. This allows us to accomplish stated Goal 3, i.e., transforming ill-formed questions into "well formed" questions.

In another experiment, the Inventors also found that users who were asked to re-type the question using the question optimizer experience prototype, and associated question transformation interface screen, of FIG. 2B, generally did a better job in re-phrasing the original question. On the contrary, users who were asked to edit the original question typically kept the original question type intact.

The third experience prototype, and associated question transformation interface screen, the Inventors explored is shown in FIG. 2C which abandons the need to choose between general knowledge/open-ended or closed-ended type/format questions upfront. This allows the user to submit/document their question, and then with that task complete, move on to optimizing/transforming it. The experience prototype, and associated question transformation interface screen, of FIG. 2C also introduces the concept of a visual question quality indicator 201, which provides a simpler read of question-quality. Research indicates/demonstrates that users will be more interested in-rephrasing/transforming their question multiple times in a quest to get the meter "into the green."

The benefits of the data driven AXC question-asking experience, and the resulting method and system for pro-actively improving answer content in a question and answer based customer support system disclosed herein, are multi-fold. Better-formulated questions improve overall user experience and increase chances of receiving better answers contributing to the user satisfaction. More importantly, new questions will be both more relevant and higher quality for the 98.5% of customers who are searching users that leverage existing answers.

The data analysis discussed above provides a compelling argument for the idea that re-phrasing general knowledge/open-ended questions to closed-ended questions using the method and system for pro-actively improving answer content in a question and answer based customer support system disclosed herein, will result in higher quality question and answer based customer support system content, thus providing higher satisfaction for both the asking and searching user. These techniques are also applied in the method and system for facilitating the production of answer content from mobile devices by customer support personnel for questions submitted to a question and answer based customer support system, according to one embodiment.

DETAILED DISCLOSURE

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In one embodiment a software system is provided. As noted above, herein, the term software system includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filing or as developed later.

Specific examples of software systems include, but are not limited to the following: TurboTax™ available from Intuit, Inc. of Mountain View, Calif.; TurboTax Online™ available from Intuit, Inc. of Mountain View, Calif.; Quicken™, available from Intuit, Inc. of Mountain View, Calif.; Quicken Online™, available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

In one embodiment a question and answer based customer support system, e.g., a social question and answer (Q&A) system, is provided to support users of the software system.

In one embodiment, the question and answer based customer support system serves as a discussion forum in an area of endeavor related to the software system. As an illustrative example, in one embodiment, the question and answer based customer support system is provided to support a tax preparation software system and therefore the discussion forum is related to "federal and state taxation and tax preparation."

In one embodiment, users of the software system are provided the capability to submit questions regarding the installation, implementation, use and operation of the software system through the question and answer based customer support system.

In one embodiment, the question and answer based customer support system includes a support community of customer support personnel. In one embodiment, the customer support personnel include paid support personnel in the employ of the provider of the software system and non-paid volunteer expert users of the software system. In one embodiment, the volunteer expert users of the software system are identified and certified by the provider of the software system.

In one embodiment, through the question and answer based customer support system, users of the software system are provided the capability to submit questions to members of the support community of customer support personnel.

In one embodiment, questions submitted to the question and answer based customer support system can be related to very different broad categories, be of various question types, have varying predicted answer lengths, and be formatted in various different ways. For example, some questions submitted to the question and answer based customer support system are product related questions, e.g., questions related to pricing, installation, version choice, etc. for the software systems that often have little or no relation to the subject matter/job of the software system, i.e., the endeavor supported by the software system. On the other hand, some questions submitted to the question and answer based customer support system are subject matter related, or substantive, questions directly related to the subject matter/endeavor of the software system.

As an illustrative example, in the case of a tax preparation software system, the questions "What version of the tax preparation software system should I use?" or "How do I install the tax preparation software system?" would be product related questions while the questions "Can I deduct my computer?" or "What is my adjusted gross income?" would be subject matter related questions.

In general, product related questions are best answered by paid support personnel in the employ of the provider of the software system while subject matter related questions are often best answered by volunteer expert users of the software system. Consequently, in one embodiment, it is desirable to identify the broad category/subject matter of the questions, e.g., product related questions and subject matter related questions, and route the questions accordingly either to support personnel or volunteer expert users of the software system. As disclosed here, the user interface elements or a mobile device user interface are configured/customized to facilitate answering subject matter related questions by volunteer expert users of the software system, according to one embodiment.

In one embodiment, the question and answer based customer support system is used to generate reusable content for the question and answer based customer support system, e.g., the question and answer based customer support system is used to generate a customer support question and answer database. In one embodiment, the creation of the customer support question and answer database is the primary goal of the question and answer based customer support system. This is because it has been empirically demonstrated that only 1.5% of users of a typical question and answer based customer support system are asking users who submit their own questions, while the remaining 98.5% of users are searching users who look for answers by searching for similar topics and questions answered in the customer support question and answer database.

As discussed below in more detail, questions submitted to the question and answer based customer support system can also be structured/formatted in a variety of ways and these various question type/formats can vary significantly in quality, length, and effort needed to answer the question.

As a specific illustrative example, questions submitted to the question and answer based customer support system can be, but are not limited to: general knowledge/open-ended type questions, defined as "Who" type/format questions, "What" type/format questions, "When" type/format questions, "Where" type/format questions, "Why" type/format questions, and "How" type/format questions; rhetorical, or otherwise "unanswerable" questions; grammatically incorrect questions and/or queries; otherwise ill-formed questions; and/or closed-ended questions, capable of being answered with a simple "Yes" or "No", or via a multi-choice, or mapping.

These question structures/formats are analyzed and used for facilitating the production of answer content from mobile devices by customer support personnel for questions submitted to a question and answer based customer support system, according to one embodiment. By analyzing the content of each question and predicting the complexity of the response, questions can be prioritized, routed, and/or made available to mobile devices of customer support personnel (e.g., volunteers) to enable the volunteers to continue providing response generation services from their cars, while waiting in lines, while waiting for transportation, while eating, while commuting, and/or any other time a person may use a mobile device to fill time or as entertainment, according to one embodiment. Furthermore, the question and answer customer support system is configured to change the content of the user interface elements based on an analysis of the question to pre-populate mobile device interfaces with potential answers to questions to reduce the burden of responding to a question from a mobile device, according to one embodiment.

As noted above, questions submitted to the question and answer based customer support system can be formulated in a variety of ways, and directed to various broad categories/subjects, such as "product related questions" and "subject matter related," or substantive questions, directly related to the subject matter/endeavor supported by the software system. As also noted above, questions submitted to question and answer based customer support system can be submitted in a variety question types/formats. Consequently, in one embodiment, the method and system for facilitating the production of answer content from mobile devices by customer support personnel for questions submitted to a question and answer based customer support system is based on an empiric question taxonomy taking into account one or more of, the question type/format, the question grammar structure, the type of anticipated answer, asker type, and various other factors.

Questions are designated as mobile device answerable questions for routing to a mobile question and answer queue, if the questions are likely to have a concise answer (e.g., less than 145 or 160 characters) and have categories/subjects that exceed a threshold level of substantive content, according to one embodiment. For example, a question is likely to have a concise answer if the answer is predicted to be less than, for example, 160 characters, is unlikely to include a web link, and is unlikely to require customer support personnel to perform research to answer the question. In addition to being likely to have a concise answer, a question that is designated as a mobile device answerable question is one that is at least 50 percent substantive in content, according to one embodiment. In other embodiments, the question that is designated as a mobile device answerable question is one that has at least 25 percent, 35 percent, 45 percent, or some other percentage of substantive content (as opposed to product-related content).

In one embodiment, closed-ended category questions are identified/defined. The closed-ended formatted questions are placed in the sub-category of "Yes/No" type questions or multiple-choice questions. These "Yes/No" type questions typically start with an auxiliary verb such as "Do", "Can", "Be." As indicated by the name, the "Yes/No" type questions can be answered by a "Yes" or "No" answer. A specific illustrative example of a "Yes/No" question would be: "Can I deduct my computer?" with the possible answers "Yes, you can" or "No, you can't."

The second sub-category of closed-ended question format includes "Choice" type questions. "Choice" type questions generally start with an auxiliary verb as well, but also contain the conjunction "or." Consequently, "Choice" type questions usually result in a multiple choice answer embedded in the body of the question. A specific illustrative example of a "Choice" type question would be "Should I install X or Y version?" with the possible answers "You need to install Y," "You need to install X," "You need to install either X or Y," "You need to install neither X or Y."

As seen in FIG. 1A, closed-ended questions result in an impressive 85.9% up vote, i.e., 85.9% of users who submit questions in the closed-ended format are satisfied with the answer provided. As also seen in FIG. 1A this is the highest satisfaction rating of all question formats. Furthermore, closed-ended questions that are "Yes/No" type questions and/or "Choice" type questions are extraordinarily easy for customer support personnel to respond to. When customer support personnel received/review "Yes/No" type questions and/or "Choice" type questions, if the customer support personnel know the answer, they can respond from their mobile devices in a matter of minutes, if not seconds. Thus, routing close-ended questions that are "Yes/No" type questions and/or "Choice" type questions to the front of a question and answer queue or routing these questions ahead of more complex questions enables the question and answer based customer support system to leverage the available time and the mobile resources of voluntary customer support personnel in reducing/managing the size of a question and answer queue, according to one embodiment.

In one embodiment, if a question submitted to the question and answer based customer support system is deemed to be neither a general knowledge/open-ended nor a closed-ended format question, the question is classified as being in the ill-formed question category by default. Many of the ill-formed category questions do not follow a grammatically correct question format either intentionally, as in the case of a search query type, or unintentionally, e.g., wrong grammar, punctuation, etc. In one embodiment, the ill-formed questions (e.g., rhetorical questions and statements) that are accepted into the question and answer based customer support system are not prioritized or identified as mobile device answerable questions and are instead routed using standard question submission procedures.

"How" and "Why" question formats are detectable with format analysis instructions that implement regular expressions analysis. Similarly "When", "Where" and "Who" question formats are detectable with format analysis instructions that implement regular expressions analysis, however, the analysis is slightly more involved as it typically requires part-of-speech tagging to avoid confusion with relative adverbs and relative pronouns. As seen in FIG. 1A these question types are less common in question and answer based customer support systems. More exotic question types such as "tag questions," "leading questions," and "embedded questions" are extremely rare in question and answer based customer support systems, and therefore are largely excluded from analysis.

In one embodiment, the question and answer based customer support system provides instructions and encouragement to the user to transform "Why" questions into another format of question to improve the general answerability of the question. In one embodiment, one or more predictive models are trained for the question and answer based customer support system by analyzing historical customer support data from one or more previous tax years to characterize a length of answers to questions having "Why", "When", "Where" and "Who" question formats. Based on the training of the one or more predictive models, the one or more predictive models generates a predicted/estimated length of answers to questions having these formats, according to one embodiment. If the application of the one or more predictive models indicates that the predicted/estimated length of the answers are less than a predetermined threshold of characters, e.g., less than 160 characters, then the question may be considered for designation as a mobile device answerable question so long as one or more other criteria are also satisfied, according to one embodiment. A typical text message is approximately 160 characters, so it is the Inventors' reasoning that having an answer that is predicted/estimated to be 160 characters or less will presumably not inconvenience customer support personnel to an extent that the customer support personnel will fail to respond to a question.

In one embodiment, user historical data indicating the user's previous interaction with the software system and/or question and answer based customer support system is obtained and used to train one or more predictive models on the answerability of questions submitted by the user and to train the one or more predictive models on the likelihood that answers to questions will be above or below a predetermined threshold, e.g., 160 characters. In one embodiment, the user historical data is used to train the one or more predictive models to determine the likelihood that answers to questions will include a web link and/or will include research on behalf of a responding user to respond to the question.

In one embodiment, user profile data indicating various user attributes is obtained. In one embodiment, the user profile data includes data obtained from other software systems used by the user and the resulting user profile data is shared with, or linked to, two or more software systems. In one embodiment, the user profile data is used to train one or more predictive models on the answerability of questions submitted by the user and to train the one or more predictive models on the likelihood that answers to questions will be above or below a predetermined threshold, e.g., 160 characters. In one embodiment, the user profile data is used to train the one or more predictive models to determine the likelihood that answers to questions will include a web link and/or will include research on behalf of a responding user to respond to the question.

As a specific illustrative example, in one embodiment, user historical data is obtained from the provided software system and/or associated question and answer based customer support system. In contrast, user profile data can be obtained from the provided software system and/or associated question and answer based customer support system, such as, for example, a tax preparation software system used by the user, and/or another software system and/or associated question and answer based customer support system, such as, for example, a personal financial management system used by the same user.

In one embodiment, questions submitted to the question and answer based customer support system by asking users, i.e., users submitting new questions, are meant to be answered by members of the support community of customer support personnel.

In various embodiments, the users of the software system enter question data through a question submission user interface provided through the question and answer based customer support system in the form of text data, audio data, symbolic data, and/or any other means, mechanism, process, or system, for entering question data as discussed herein, and/or as known in the art at the time of filing, and/or as developed after the time of filing.

As noted above, questions submitted to the question and answer based customer support system can be formulated in a variety of ways, directed to various broad categories/subjects, and in be submitted in various question formats representing various question types.

In one embodiment, as the question data is being entered by a user, and/or is otherwise received, the question data is parsed and analyzed before providing the question data to any of the one or more support personnel. As noted above, in one embodiment, questions submitted to the question and answer based customer support system by asking users are meant to be answered by members of the support community of customer support personnel. However, using the methods and systems disclosed herein, the question data is parsed and analyzed before providing the question data to any of the one or more support personnel to determine if the question data represents a mobile device answerable question, prior to routing the question to a mobile question and answer queue or to a standard question and answer queue.

In one embodiment, as the question data is being entered and/or submitted, the question data is parsed and analyzed using the format analysis instructions required to identify the question formats generated and stored as described above.

In one embodiment, general knowledge/open-ended category questions submitted are identified. As noted above, general knowledge/open-ended category questions are of the form "Who," "What," "Where," "When," "How," and "Why" formatted questions. Consequently, in one embodiment, the question data is analyzed to detect these terms, or their functional equivalents, to predict the lengths of responses to these questions to determine whether to route the questions to the mobile question and answer queue.

In one embodiment, "How" and "Why" question formats are detectable using format analysis instructions that implement regular expressions analysis. Similarly "When", "Where" and "Who" question types are detectable using format analysis instructions that implement regular expressions analysis, however, the analysis is slightly more involved as it typically requires part-of-speech tagging to avoid confusion with relative adverbs and relative pronouns.

In one embodiment, closed-ended category questions submitted are identified. In general, closed-ended question formats are detectable using format analysis instructions that implement regular expressions analysis. Closed-ended category questions are analyzed to determine whether they are product related questions or subject matter questions. The closed-ended questions are routed to the mobile question and answer queue if the questions are at least partially, e.g., at least 50%, subject matter questions, in one embodiment.

As noted above, most closed-ended category format questions are in the sub-category of "Yes/No" type questions. These "Yes/No" type questions are identified by the fact that they typically start with an auxiliary verb such as "Do", "Can", "Be." As also noted above, the second sub-category of closed-ended question format includes "Choice" type questions. These "Choice" type questions are identified by the fact that they generally start with an auxiliary verb and also contain the conjunction "or."

In various embodiments, the one or more corrective actions are taken with improperly formatted questions, including, but not limited to, filtering out the improperly formatted questions before the improperly formatted questions are forwarded/provided to the support community, and before any resources are devoted to answering the improperly formatted questions. In various embodiments, the one or more corrective actions taken include, but are not limited to, avoiding the improperly formatted questions completely by refusing to accept submission of the improperly formatted questions. In various embodiments, the one or more corrective actions taken include, but are not limited to, attempting to correct the improperly formatted questions by providing the user with a set of format transformation/question reformation instructions, in one embodiment, customized to the user based on the user historical data and/or user profile data. In one embodiment, the set of format transformation/question reformation instructions are used to transform an improperly formatted question into a properly formatted question.

In one embodiment, the user is provided the format transformation/question reformation instructions representing suggestions on how to re-phrase/reform the improperly formatted question that are customized to the specific question data being submitted, and/or customized to the user based on the user historical data and/or user profile data, in relative real-time. As a result, improperly formatted questions can transformed into properly formatted questions that enable the responding users to understand the questions, and to potentially qualify a question for expedited or prioritized routing to the mobile question and answer queue.

The disclosed question and answer based customer support system analyzes a question, determines if the question is suitable/convenient for response on a mobile device, and configures the user interface elements of the user interface on the mobile device based on the analysis of the question, to make it easier (if possible) for the customer support personnel (e.g., the volunteers) to respond to the question, according to one embodiment. In one embodiment, for closed-ended questions (e.g., binary choice or multiple choice), the question answer based customer support system configures the user interface elements with buttons that the customer support personnel can use to answer the question. For example, if the question and answer based customer support system determines that a question is a "Yes/No" question, the question and answer based customer support system pre-populates the user interface with a button that is labeled "Yes" and with a button that is labeled "No", to enable the customer support personnel to respond to the question with a simple click/touch of a button. If the question and answer based customer support system determines that a question is a multiple-choice question, the question and answer based customer support system parses the question to determine the response options for the question and pre-populates the user interface with buttons that are labeled with those response options, e.g., "TurboTax Free" and "TurboTax Deluxe", according to one embodiment. Because many of the customer support personnel volunteers already respond to questions during leisure or available time, facilitating question responses via mobile devices can increase the quantity and decrease the response times to questions submitted to the question and answer based customer support system, according to one embodiment. By pre-populating the mobile device user interfaces, the question answer based customer support system can increase the volume of responses provided by customer support personnel within a given time (i.e., increase the response rate), to take advantage of the precious resource of volunteer hours contributed to assist customers and/or tax filers who are seeking for tax-related assistance, according to one embodiment. The disclosed systems and methods for facilitating the production of answer content from mobile devices by customer support personnel for questions submitted to a question and answer based customer support system solves a business need to provide timely responses to customers and potential customers, even though the number of questions submitted to the service may exceed the response capacity of the service provider's paid employees.

In one embodiment, the method and system for facilitating the production of answer content from mobile devices by customer support personnel for questions submitted to a question and answer based customer support system includes performing pre-question submission parsing of the question content data and analysis of the attributes of the question, to predict the answerability of the questions from a mobile device. Examples of attributes of the question include, but are not limited to, type, subject matter, category, estimated response length, and format, according to one embodiment. In one embodiment, the answerability of a question from a mobile device is determined based on multiple attributes of a question, such as predicted length of the answer, whether it is predicted that the answer will include one or more web links, and/or whether it is predicted that the user can respond to the question without performing research. One or more predictive models are trained using one or more years of existing question and answer data to determine estimates/predictions of the answer length, whether the answer will include a web link, and/or whether a user will have to perform research to answer the question, according to one embodiment.

In one embodiment, questions that are determined to be suitable for or answerable from a mobile device are routed to a mobile question and answer queue in a question and answer database that is within the question and answer based customer support system. The question and answer based customer support system sorts and/or filters questions in the question and answer database, so that customer support personnel using mobile devices are optionally able to receive, view, and/or access the mobile device answerable questions before being presented with more difficult or challenging questions, according to one embodiment.

Using the concepts disclosed herein, the answerability of questions from a mobile device is predicted before the question is formally submitted to the question and answer based customer support system. If the question is deemed answerable from a mobile device, the question is prioritized for presentation to mobile devices for customer support personnel, and the user interface elements for the mobile device are configured/customized based on an analysis of the question, according to one embodiment. In one embodiment, the user interface elements include buttons with pre-populated answers for the customer support personnel to choose from when responding to the question. In this manner, there is a higher likelihood that the question will be understood and conveniently answered by volunteer customer support personnel throughout the day with their mobile devices to enable volunteer customer support personnel to spend more parts of the day managing and/or reducing the quantity of unanswered questions in a question and answer queue.

The disclosed method and system for facilitating the production of answer content from mobile devices by customer support personnel for questions submitted to a question and answer based customer support system provides for significant improvements to the technical fields of customer support, information dissemination, software implementation, and user experience. In addition, using the disclosed method and system for facilitating the production of answer content from mobile devices by customer support personnel for questions submitted to a question and answer based customer support system results in more efficient use of human and non-human resources, fewer processor cycles being utilized, reduced memory utilization, and less communications bandwidth being utilized to relay data to and from backend systems. As a result, computing systems are transformed into faster, more efficient, and more effective computing systems by implementing the method and system for facilitating the production of answer content from mobile devices by customer support personnel for questions submitted to a question and answer based customer support system disclosed herein.

Figure 3A:
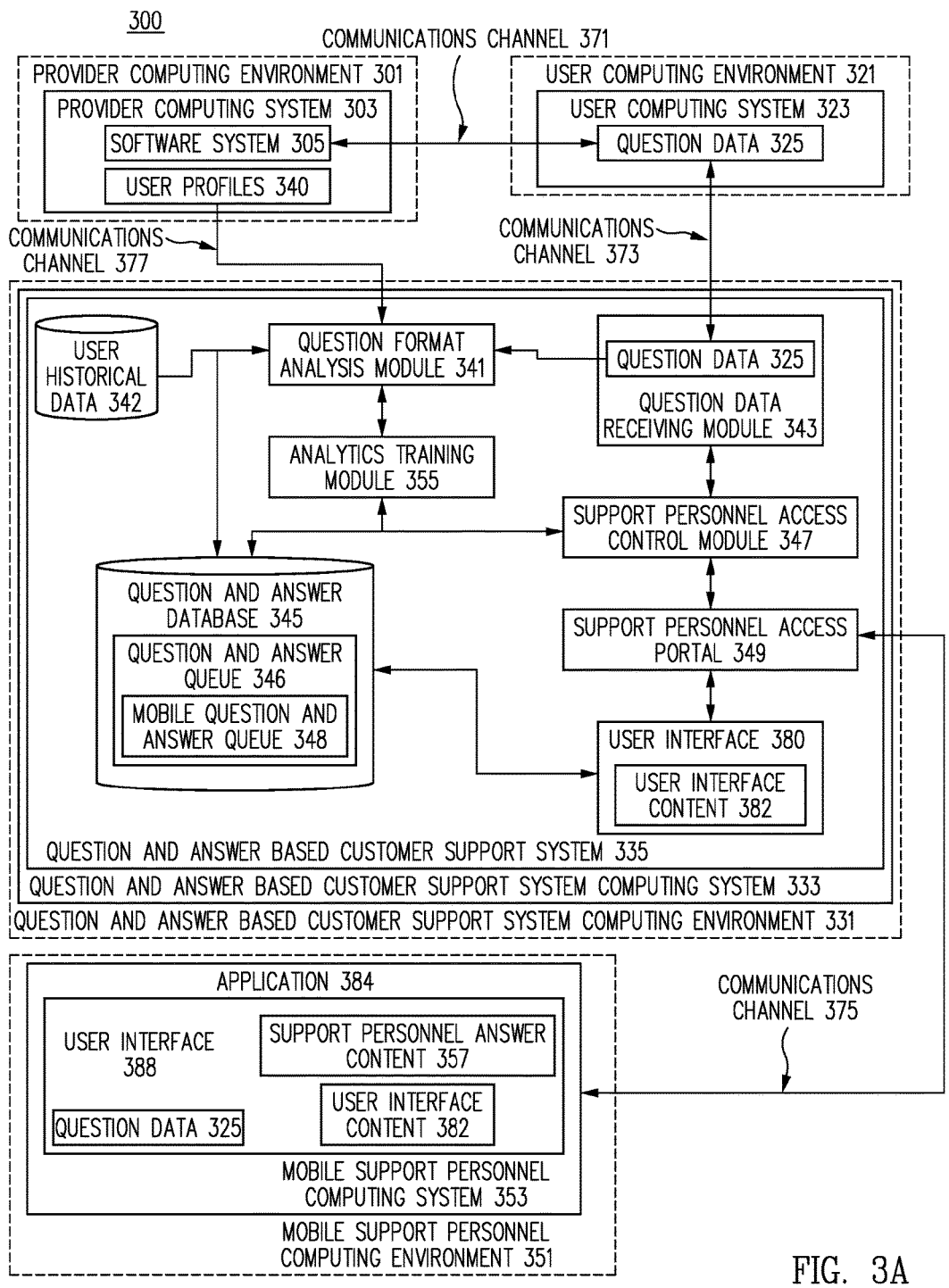
FIGS. 3A and 3B are block diagrams of a hardware system and production environment for facilitating the production of answer content from mobile devices by customer support personnel for questions submitted to a question and answer based customer support system in accordance with one embodiment.

FIG. 3 is a block diagram of a hardware and production environment system 300 for facilitating the production of answer content from mobile devices by customer support personnel for questions submitted to a question and answer based customer support system, to reduce the latency between question submission and answer submission, to improve utilization of customer support personnel availabilities, and/or to reduce the number of unanswered questions queued by the question and answer based customer support system, in accordance with one embodiment.

As seen in FIG. 3, in one embodiment, a provider computing system 303 is provided in provider computing environment 301 and includes software system 305. In various embodiments, software system 305 is any software system discussed herein, known at the time of filing, and/or as developed after the time of filing.

As also seen in FIG. 3, user computing system 323 is provided in user computing environment 321. In one embodiment, a user of software system 305 accesses provider computing system 303 and software system 305 via communications channel 371.

In one embodiment, the users of software system 305 are also provided a question and answer based customer support system 335 shown as implemented on question and answer based customer support system computing system 333 in question and answer based customer support system computing environment 331.

In one embodiment, through question and answer based customer support system 335, users can submit question data 325 via communications channel 373. The question data 325 represents a product related question, a subject matter (e.g., tax law) question, or some combination of a product related and a subject matter question, according to one embodiment. In one embodiment, question data 325 is entered by the users and represents questions to potentially be provided to one or more support personnel associated with question and answer based customer support system 335. In one embodiment, question data 325 is submitted by the users so that the questions represented by question data 325 can potentially be answered by at least one of the one or more support personnel associated with mobile support personnel computing system 353 shown as implemented in mobile support personnel computing environment 351.

In one embodiment, when question data 325 is being entered by a user, and/or is otherwise received by question and answer based customer support system 335, the question data 325 is parsed and analyzed by question format analysis module 341 before providing question data 325 to any of the one or more support personnel at mobile support personnel computing system 353 to answer to the question represented by question data 325. In one embodiment, the question data 325 is received by the question and answer based customer support system 335 with a question data receiving module 343 via the communications channel 373.

The question and answer based customer support system 335 includes a question format analysis module 341 that parses and/or analyzes the question data 325 to determine if the question is suitable for being answered from a mobile device by the one or more support personnel, according to one embodiment. The question format analysis module 341 parses the question of the question data 325 to analyze the content of the one or more sentences included in the question data 325, according to one embodiment. In analyzing the question data 325, the question format analysis module 341 determines the various attributes of the question or questions that are represented by the question data 325, according to one embodiment. The attributes of a question include, but are not limited to, category (e.g., product related or subject matter related), type (e.g., closed-ended or open-ended), "Yes/No" closed-ended question, multiple-choice closed-ended question, factoid open-ended question, predicted/estimated answer length to the question, likelihood of web link needed in the answer, likelihood of research by support personnel needed to respond to the question, whether the question is mobile device answerable, whether the question is unanswerable, and the like, according to one embodiment. In one embodiment, the question format analysis module 341 relies on one or more predictive models or analytics models to analyze the question data 325. In one embodiment, the question format analysis module 341 analyzes the question data 325 at least partially based on the user profiles 340 (which are related to user interactions with the software system 305), user historical data 342 (which is related to user interactions with the question and answer based customer support system 335), one or more pre-determined question formats, and/or one or more predictive models.

The user profiles 340 includes information about the user that is collected from the user and/or about the user while the user interacts with a software system 305, and are communicated to the question format analysis module 341 through a communications channel 377, according to one embodiment. The user profiles 340 can include, but is not limited to, browsing behaviors, clickstream data, age, income, zip code, experience level with electronic tax return preparation systems, occupation, and the like, according one embodiment.

The user historical data 342, as described above, includes interaction history of the user with the question and answer based customer support system 335, according to one embodiment. The user historical data 342 includes, but is not limited to, previous questions submitted, feedback provided for searched answers, search history, contributions to the customer support unity, and the like, according to one embodiment.

The question format analysis module 341 uses the analysis of the question data 325 to determine if the question that is associated with the question data 325 is suitable for support personnel to respond to using a mobile device, according to one embodiment. The question format analysis module 341 can use a number of criteria for determining whether a question is a mobile device answerable question, e.g., a question that is suitable for being answered from a mobile device. In one embodiment, closed-ended questions are determined, by the question format analysis module 341, to be mobile device answerable questions because they can be answered with a concise, constrained, or limited number of characters, e.g., 160 characters. In one embodiment, the question format analysis module 341 determines that factoid open-ended questions are mobile device answerable questions. Factoid open-ended questions are questions that are not "Yes/No" questions or multiple-choice questions, but that are questions that can be answered concisely in one, two, or a few words by providing a dollar amount, an age, a date, a number, and/or some other piece of fact-related datum, according to one embodiment. An example of a factoid question is, "what age can I receive retirement plan distributions without penalty?" In one embodiment, the question format analysis module 341 determines that open-ended questions are mobile device answerable questions if the open-ended questions satisfy multiple criteria. The multiple criteria include having an estimated answer length that is within a predetermined threshold (e.g., 160 characters), and having an answer that is predicted to not include a web link, according to one embodiment. The multiple criteria include having an estimated answer length that is within a predetermined threshold, having an answer that is predicted to not including web link, and having an answer that is predicted to be generated by support personnel without the support personnel performing research, according to one embodiment. In one embodiment, the question format analysis module 341 determines that unanswerable questions, e.g., statements and rhetorical questions, or not mobile device answerable questions. To clarify, although even some open-ended questions theoretically could be answered using a mobile device, as used herein, a "mobile device answerable question" is a question that is presented to mobile devices of one or more support personnel because the questions are answerable from a mobile device without significantly burdening the responding user with a need to formulate a lengthy answer, perform research, and/or insert one or more web links into the response, according to one embodiment. The question format analysis module 341 is configured to identify mobile device answerable questions in a question-and-answer queue, and/or is configured to route mobile device answerable questions to a mobile question and answer queue, according to one embodiment.

The question and answer based customer support system 335 includes a question and answer database 345, configured to store, manage, and provide a question and answer queue 346 and a mobile question and answer queue 348, according to one embodiment. The mobile question and answer queue 348 receives, maintains, and selectively provides access to mobile device answerable questions, according to one embodiment. In one embodiment, the question and answer queue 346 receives/maintains all questions and answers associated with the question and answer based customer support system 335, but distinguishes between non-mobile device answerable questions and mobile device answerable questions by identifying (e.g., with attributes) the different types of questions differently within the question and answer database 345. In an alternative embodiment, the question and answer queue 346 is a separate page, table, or data structure from the page, table, or data structure used for the mobile question and answer queue 348, according to one embodiment. In yet another embodiment, the question and answer queue 346 and the mobile question and answer queue 348 are hosted in one or more separate databases.

The questions that are routed to the mobile question and answer queue 348 are identified differently, ordered differently, queued differently, displayed differently, have different attributes, and/or otherwise distinguished from standard/non-mobile questions, to facilitate recognition, access and response by the one or more support personnel who use the mobile support personnel computing system 353. Most people who have a mobile device, such as a mobile phone, a tablet computing device, and/or a personal digital assistant, carry the mobile device with them throughout the day and use one or more mobile applications to fill idle time while waiting for one or more life events to occur, e.g., while waiting at a bus stop, while commuting, while waiting in line at a grocery store, while watching television, etc. By prioritizing, distinguishing, or otherwise emphasizing easily/conveniently answerable questions for mobile device users, the question and answer based customer support system 335 is configured to attract the attention and services of the volunteer customer support personnel who respond to unanswered questions hosted by the question and answer database 345.

The question and answer based customer support system 335 is configured to use an analytics training module 355 to train one or more predictive models in the question format analysis module 341, according to one embodiment. The analytics training module 355 uses the user profiles 340, user historical data 342, content of the question and answer database 345, and/or other information to train the question format analysis module 341, according to one embodiment. The analytics training module 355 is configured to, in relative real time, continue to train/optimize the question format analysis module 341 using information that is gathered from the mobile support personnel computing systems 353, according to one embodiment. For example, when a responding user reads, analyzes, responds to, and/or rejects a question associated with the question data 325, the responding user's information is stored as support personnel answer content 357, according to one embodiment. The analytics training module 355 receives the support personnel answer content 357 through the support personnel access portal 349 and/or through the support personnel access control module 347, and uses the support personnel answer content 357 to train the question format analysis module 341, according to one embodiment. The analytics training module 355 can be configured to daily, weekly, monthly, quarterly, or otherwise perform event-based or periodic training/optimizing of the question format analysis module 341 based on the support personnel answer content 357, according to one embodiment.

Figure 3B:
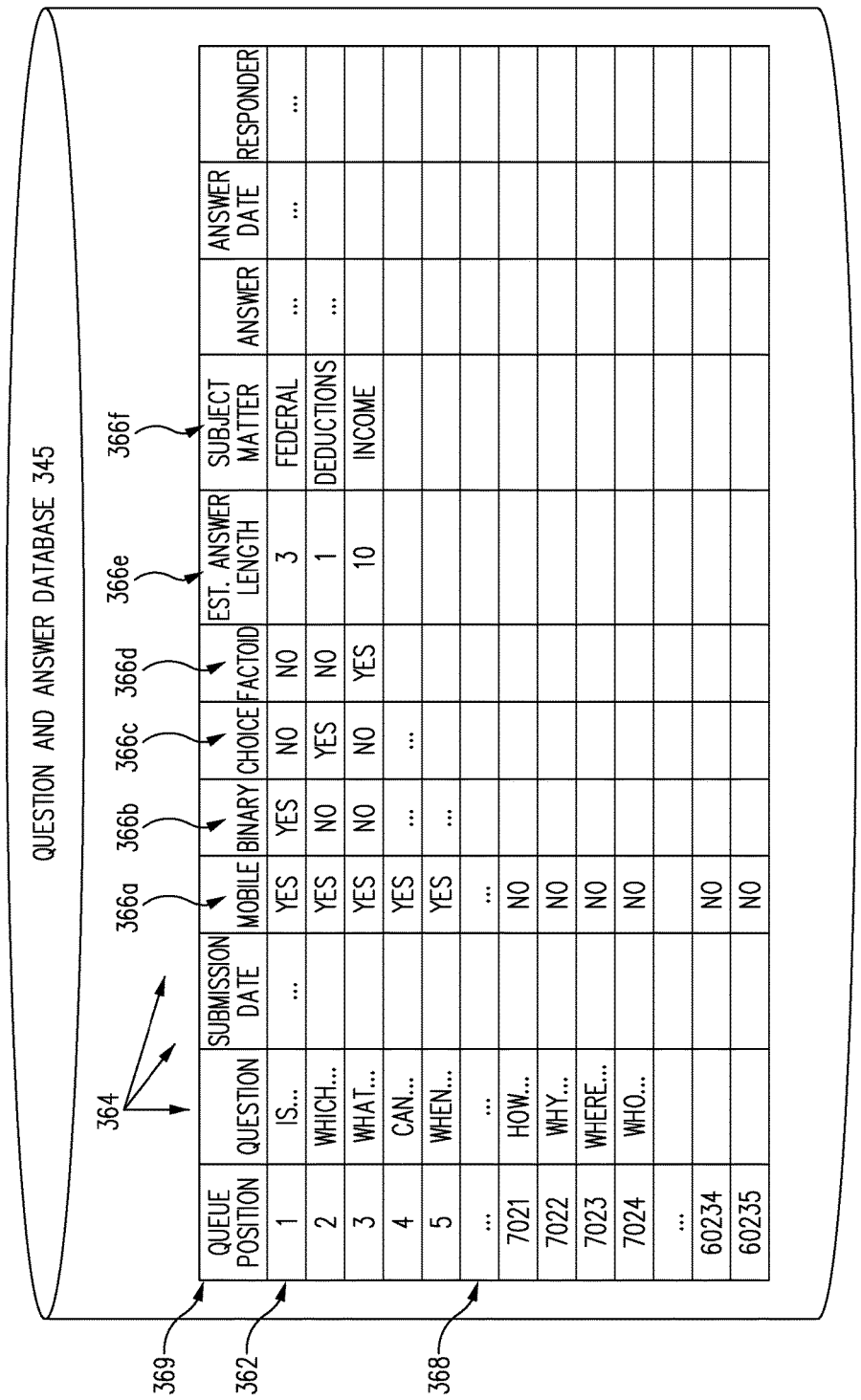

FIG. 3B is a more detailed embodiment of the question and answer database 345 in the question and answer based customer support system 335, according to one embodiment. The question and answer database 345 is illustrated with a table 369, to represent the question and answer queue 346 and the mobile question and answer queue 348, according to one embodiment. The table 369 includes a number of rows 362 and a number of columns 364, according to one embodiment. Each row 362 represents an entry of an unanswered (or answered) question in the table 369, and each of the columns 364 represent an attribute of each of the entries in the table 369, according to one embodiment. Example columns/attributes include, but are not limited to, queue position, question, mobile, submission date, answer, answer date, responder, binary, choice, factoid, estimated answer length, and subject matter, according one embodiment. It is to be understood that the illustrated columns are but representative of significantly more columns that would be included in an actual page/table in the question and answer database 345. The attributes 366a, 366b, 366c, 366d, 366e, 366f (collectively attributes 366) represent attributes of the question and that are used by the question and answer customer support system 335 to determine and/or to indicate whether a question is answerable from a mobile device, as described herein, according to one embodiment. The attributes 366 are used by the question and answer customer support system 335 to configure and/or customize a user interface for the mobile support personnel computing system 353 (e.g., for a mobile device). As illustrated, some of the questions are not designated as suitable for response from a mobile device, and other questions are designated as suitable for response from a mobile device. In one embodiment, the table 369 is sorted based on the answerability/suitability of a question for response from a mobile device. In one embodiment, when a responding/replying user accesses the question and answer database 345, the responding/replying user is presented with a sorted/filtered version of the table 369 so that only the questions having an affirmative mobile indication attribute are presented to the user. As used herein a "responding user" is interchangeably used with a "replying user", according to one embodiment. In another embodiment, when a responding user accesses the question and answer database 345, the responding user is presented with a sorted version of the table 369 so that the questions having an affirmative mobile indication attribute are presented first and are followed by questions having a negative mobile indication attribute. In one embodiment, when the question and answer based customer support system 335 adds a new mobile device answerable question to the table 369, the new mobile device answerable question is inserted into the table immediately after the last mobile device answerable question. For example, a new mobile device answerable question would be inserted into table location 368 (e.g., after queue position 5), to displace the question that was in the table location 368 and that had a negative mobile indication attribute, according to one embodiment. In one embodiment, the table 369 (e.g., the queue) is operated with first in first out priority scheduling for mobile device answerable questions. In another embodiment, the table 369 is operated with first in last out priority scheduling for mobile device answerable questions. In one embodiment, one or more responding users are notified of new mobile device answerable questions that are within a particular field of expertise for those responding users, to expedite and encourage the responding users to respond to unanswered questions within the question and answer database 345. In one embodiment, mobile device answerable questions and/or all questions within the table 369 or within the question and answer database 345 are sortable/filterable from a user interface that is hosted or populated by the question and answer based customer support system 335.

Returning to FIG. 3A, the question and answer based customer support system 335 includes a user interface 380 for hosting or providing user interface content 382, according to one embodiment. The user interface content 382 is configured and/or customized based on attributes of the question data 325, which are determined by the question format analysis module 341, according to one embodiment. The user interface content 382 includes, but is not limited to, questions, buttons, text boxes, labels, audio content, video content, menus, radio buttons, checkboxes, drop-down menus, lists, directories, and the like, according to various embodiments. In one embodiment, the question and answer based customer support system 335 customizes the user interface content 382 based on the attributes of the question data 325, by pre-populating buttons with answers to questions, to enable the one or more support personnel to respond to a question with the mere click/touch of a button. The user interface 380 delivers the user interface content 382 to an application 384 that is executed on the mobile support personnel computing system 353, to enable the one or more support personnel to respond to the question associated with the question data 325, according to one embodiment.

The application 384 is configured to execute a user interface 386 to enable a responding user to use the mobile support personnel computing system 353 to interact with the question and answer based customer support system 335, according to one embodiment. In one embodiment, the application 384 is a web browser and the user interface 380 hosts a webpage and the user interface content 382 from the question and answer based customer support system 335. In one embodiment, the application 384 is a mobile application (e.g., an "app") that is executed from the mobile support personnel computing system 353, and which receives the user interface content 382 and displays the user interface content 382 in a user interface 388, according to one embodiment. In one embodiment, the user interface content 382 includes various user interface elements used by the user interface 380 or 388 to support the presentation of the question data 325. In one embodiment, the user interface content 382 includes all or part of the question data 325 and/or the attributes of the question data 325.

User Experience

FIGS. 4A, 4B, 4C, 4D, and 4E are illustrations of example embodiments of the user interfaces 380 and/or 388 for facilitating the production of answer content from mobile devices by customer support personnel for questions submitted to the question and answer based customer support system 335, in accordance with one embodiment.

Figure 4A:
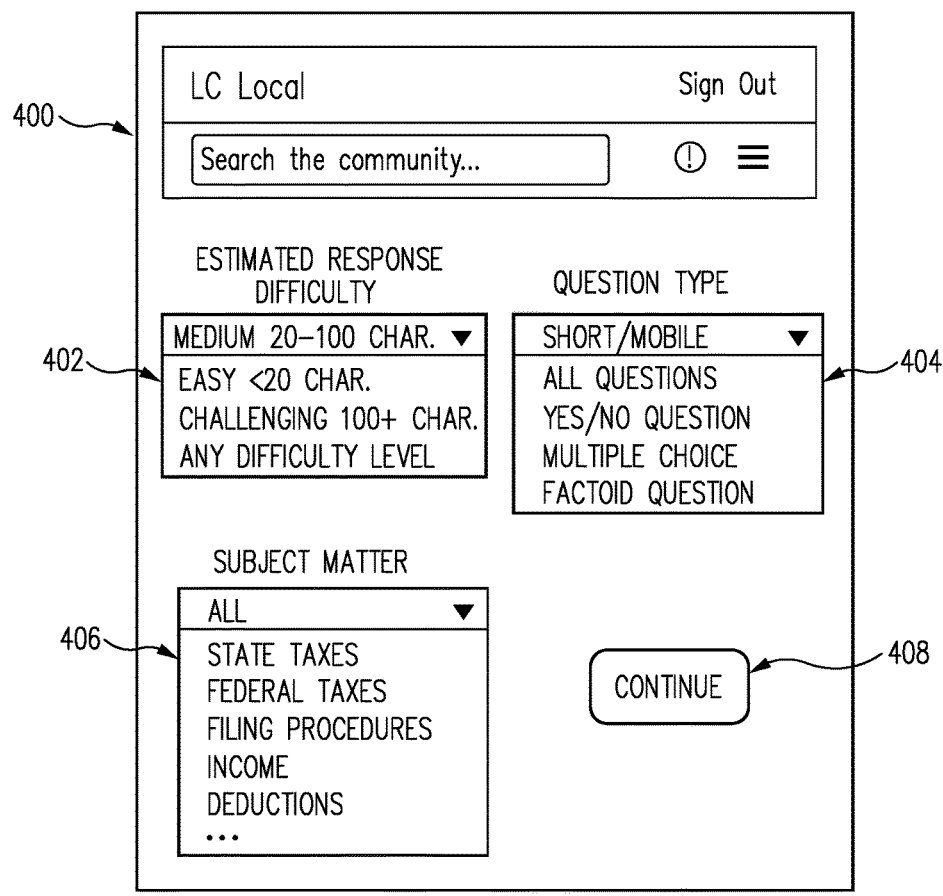
FIGS. 4A, 4B, 4C, 4D, and 4E are illustrations of example user interfaces for facilitating the production of answer content from mobile devices by customer support personnel for questions submitted to a question and answer based customer support system in accordance with one embodiment.

FIG. 4A illustrates a user interface 400 that is configured to enable the one or more support personnel to sort, filter, and/or determine which questions the question and answer based customer support system 335 presents to the support personnel, to facilitate response generation to questions submitted to the question and answer based customer support system 335, according to one embodiment. The user interface 400 includes a question difficulty menu 402, a question type menu 404, a question subject matter menu 406, and a submission button 408, according to one embodiment. The menus 402, 404, and 406 enable the responding user to filter the questions presented to the responding user by the question and answer based customer support system 335, at least partially based on the analysis performed and on the attributes identified by the question and answer based customer support system 335, according to one embodiment. The question difficulty menu 402 includes various options for the responding user to choose from, such as, but not limited to, "EASY", "MEDIUM", "CHALLENGING", "ANY DIFFICULTY LEVEL", according to one embodiment. Each of the levels of difficulty are associated with a range of characters that are predicted/estimated to be needed to respond to a question. For example, an "EASY" question is associated with an answer that is predicted/estimated to have less than 20 characters, a "MEDIUM" question is associated with an answer that is predicted/estimated to have approximately 20-100 characters, a "CHALLENGING" question is associated with an answer that is predicted/ estimated to have approximately more than 100 characters, according to one embodiment. In other embodiments, the ranges of characters are different than those specifically stated, and different labels for levels of difficulty can be used. The question type menu 404 includes various options for the responding user to choose from, such as, but not limited to, "ALL QUESTIONS", "YES/NO QUESTION", "MULTIPLE CHOICE", "FACTOID QUESTION", and "SHORT/MOBILE", according to one embodiment. The various options within the question type menu 404 correspond to question attributes which may be included in the question and answer database 345, according to one embodiment. The question subject matter menu 406 includes various options for the responding user to choose from, such as, but not limited to, "ALL", "STATE TAXES", "FEDERAL TAXES", "FILING PROCEDURES", "INCOME", "DEDUCTIONS", and the like, according to one embodiment. The various options within the question type menu 404 correspond to question attributes which may be included in the question and answer database 345, according to one embodiment. In one embodiment, the question and answer based customer support system 335 uses the selections made by the responding user in menus 402, 404, and 406 to sort or filter part of the question and answer database 345 and to provide the responding user with unanswered questions based on the sorting performed by the question and answer based customer support system 335. The submission button 408 includes the label "CONTINUE", but can have other labels such as "SAVE", "PROCEED", "SUBMIT", and the like.

Figure 4C:
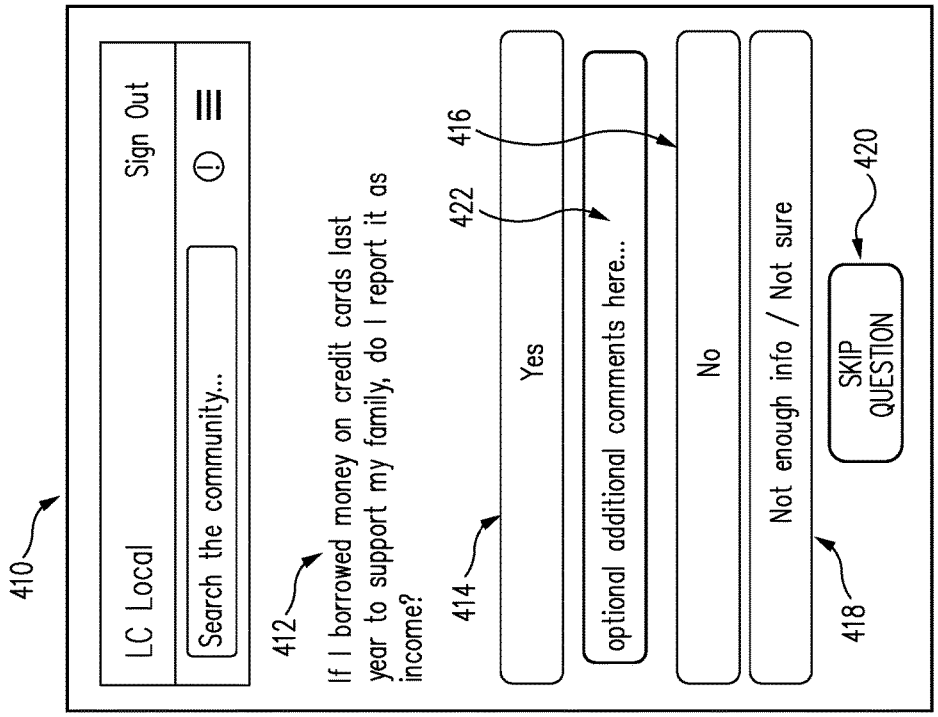
Figure 4B:
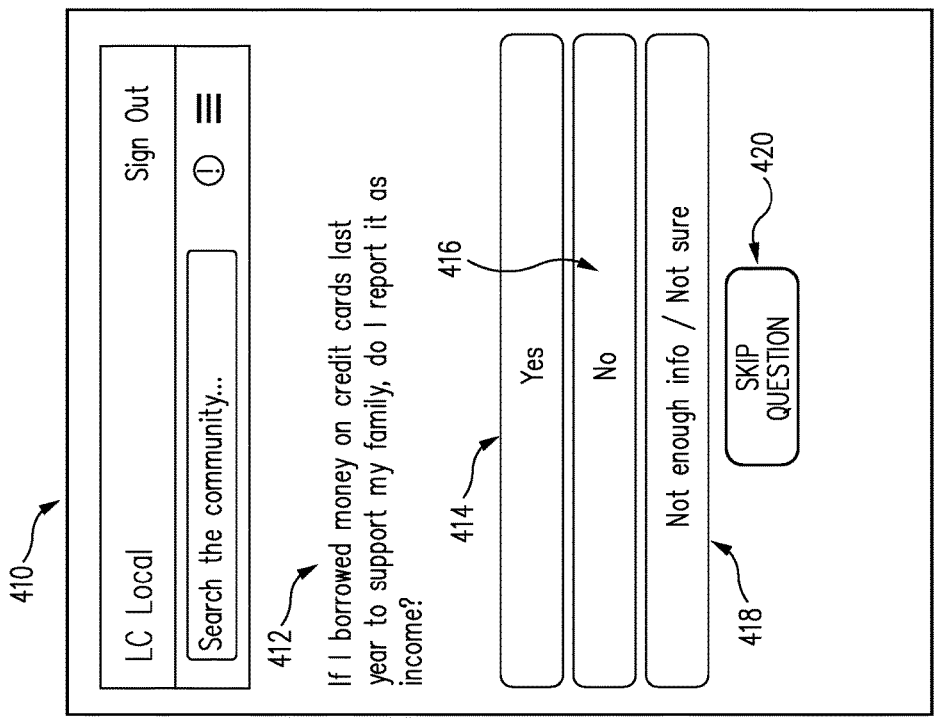

FIG. 4B illustrates a user interface 410 that enables the one or more support personnel to conveniently respond to a closed-ended "Yes/No" question that has been determined to be a mobile device answerable question by the question and answer based customer support system 335, according to one embodiment. The question and answer based customer support system 335 customizes and/or configures user interface content 382, such as response buttons 414, 416, 418, and 420, based on an analysis, a parsing, and attributes of the question 412, according to one embodiment. The response buttons 414, 416, 418, and 420 can be assigned various functions. In one embodiment, the response button 414 is an affirmative response button, which may be labeled "Yes", and the response button 416 is a negative response button, which may be labeled "No". In one embodiment, the response button 418 indicates that the question and answer based customer support system 335 may have incorrectly parsed and/or analyzed the question 412, and may be labeled "Not enough info/Not sure", according to one embodiment. The response button 420 enables support personnel to skip a particular question, and may be labeled "SKIP QUESTION", according to one embodiment.

FIG. 4C illustrates another embodiment of the user interface 410, in response to a user selecting the response button 414, which is assigned as an affirmative response button. In one embodiment, if the support personnel/responding user selects the response button 414, the user interface 410 presents a text box 422 to enable the support personnel to add additional optional comments to the asking user, to supplement the affirmative response to the question 412, according to one embodiment.

Figure 4E:
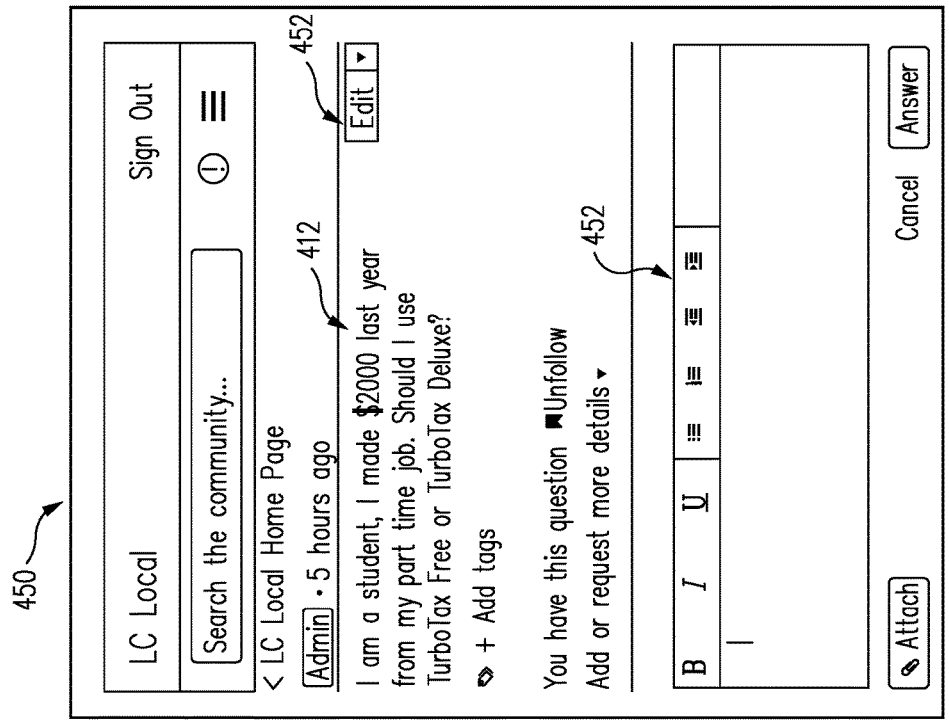
Figure 4D:
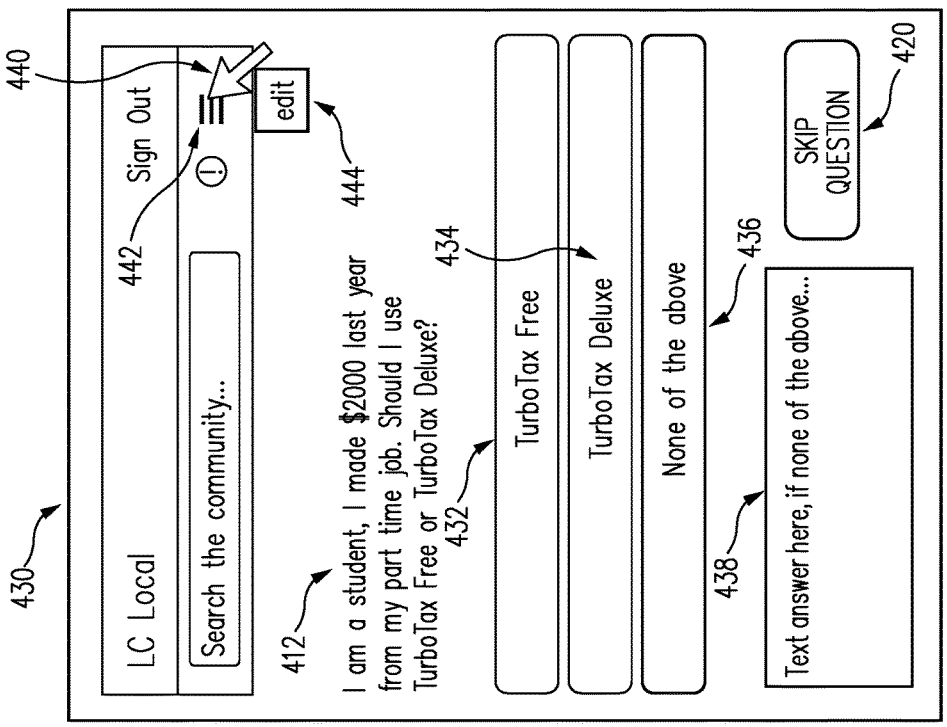

FIG. 4D illustrates a user interface 430 that enables the one or more support personnel to conveniently respond to a closed-ended multiple choice question that has been determined to be a mobile device answerable question by the question and answer based customer support system 335, according to one embodiment. In addition to the question 412, the user interface 430 displays response buttons 420, 432, 434, and 436, according to one embodiment. The response buttons 432, 434, and 436 are examples of user interface content 382 that is customized and/or configured to facilitate mobile device responses by support personnel based on content of the question 412, according to one embodiment. For example, when the question and answer based customer support system 335 parses and analyzes the question 412, the system determines that the question is a multiple-choice, and the system determines at least some of the potential responses to the question. The question and answer based customer support system 335 customizes the response buttons 432, 434, and 436 (or other user interface content 382) by populating the labels or identifiers of the response buttons with the potential responses identified from the content of the question 412, according to one embodiment. For example, the question 412 can include response choices "TurboTax Free" and "TurboTax Deluxe", and the response button 432 is labeled "TurboTax Free" and the response button 434 is labeled "TurboTax Deluxe", based on the analysis of the question 412, according to one embodiment. The user interface 430 optionally provides the response button 436, which is labeled "None of the above" to provide the one or more support personnel with the option of typing in or submitting an alternative response to the question, which the asking user may not have considered, according to one embodiment. The user interface 430 provides a text box 438 or other user interface element to enable the support personnel to submit a text based response to the question 412, according to one embodiment. The response button 420 also enables the support personnel/responding user to skip answering the question 412, according to one embodiment. By pre-populating buttons or other user interface elements with likely answers to the questions submitted by asking users, the question and answer based customer support system 335 reduces the effort and time needed for volunteer customer support personnel to respond to question submissions. By reducing both the effort and time needed to respond to a question, the volume of responses from one or more support personnel can be increased/improved within a given period of time. In other words, the answer rate for responses to unanswered questions maintained in the question and answer database 345 can be improved, by leveraging the availability and convenience of responding to questions using mobile devices.

The user interface 430 enables the support personnel to use a cursor 440 (e.g., a finger or pointing device) to select a menu 442, to display and edit option 444 for selection with the cursor 440, according to one embodiment. By selecting the edit option 444, the support personnel are provided with additional options for responding to the question 412, according one embodiment.

FIG. 4E illustrates a user interface 450 that includes additional options for responding to the question 412, according to one embodiment. If a closed-ended question includes an error or inadequate options, the user interface 450 can be used to edit the question and/or to submit a text-based response. In one embodiment, the user interface 450 is displayed with the question 412, when the question 412 is an open-ended question that is ill-suited for response by using the pre-populated response buttons. The user interface 450 includes an edit menu 452 and a text box 454, for editing the content of the question 412 and for providing a text-based answer to the question 412, according to one embodiment. The user interface 450 is also configured to include one or more various response options to enable the support personnel to, for example, attach a file, attach a web link, attach a reference to another question/answer, submit an answer, communicate with an asking user, add an attribute to the question, and the like, according to various embodiments.

By eliminating or reducing the quantity of characters that support personnel enter to respond to submitted questions, and by providing pre-populated answers to questions for the support personnel, the service provider of the customer support system communicates to the support personnel that their contributions, skills, time, and energy are valued by the service provider. Supporting the support personnel (e.g., the volunteer customer support personnel) with tools that are catered to their needs and that are configured to make it easier for them to provide voluntary services to the service provider and to the tax filing community at large may have the effect of motivating and enabling the support personnel to respond more quickly, more frequently, and during more of their windows of availability, according to one embodiment. The business problems solved and the business benefits received by the service provider include a reduction of an unanswered question queue, faster response times to submitted questions, increased contributions by experts who are not directly employed and/or compensated by the service provider, and an expanded library of free resources available for searching use by anyone seeking self-help support, such as low income tax filers, according to one embodiment.

Process

Figure 5:
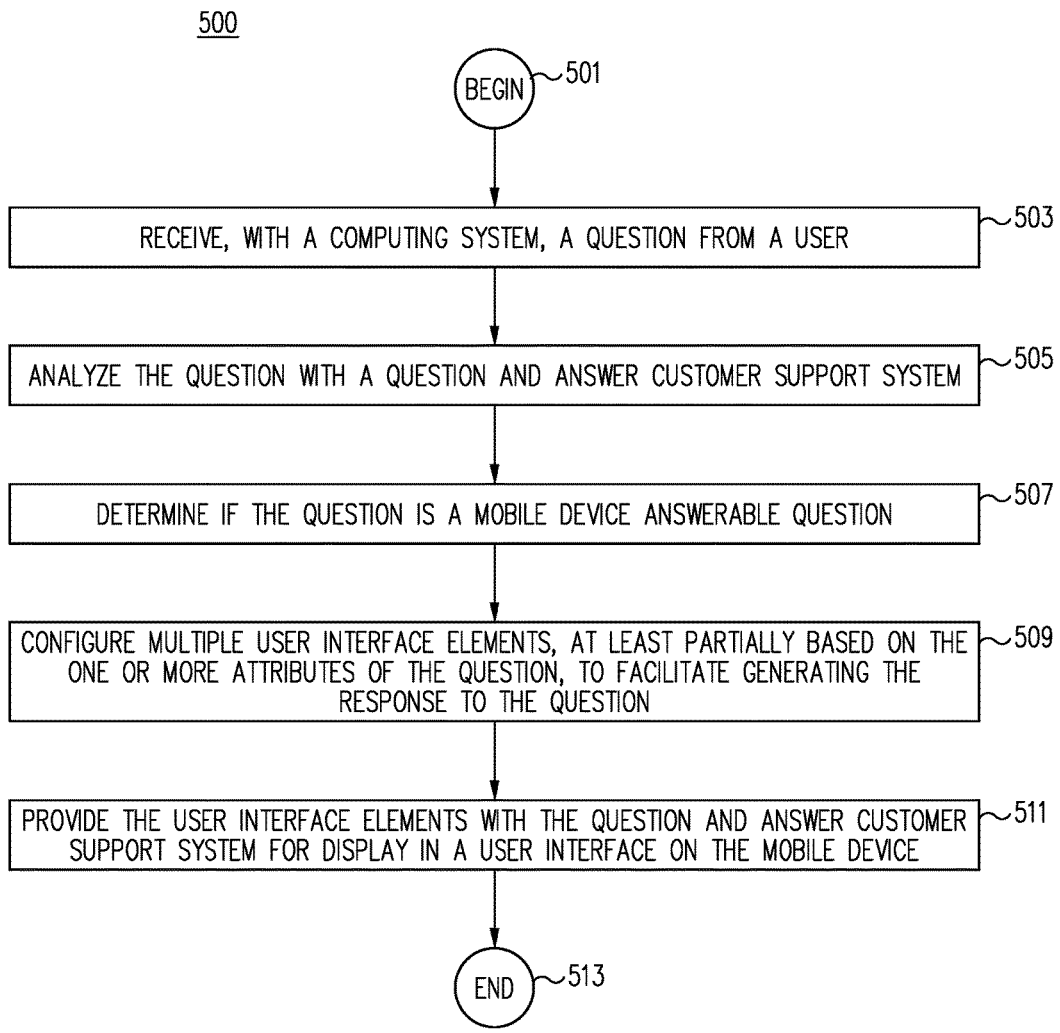
FIG. 5 is a flow chart representing one example of a generalized process for providing a process for facilitating the production of answer content from mobile devices by customer support personnel for questions submitted to a question and answer based customer support system in accordance with one embodiment.

FIG. 5 is a flow chart representing one example of a process 500 for increasing the use of mobile devices by customer support personnel to respond to unanswered questions in a question and answer based customer support system, by facilitating response generation by the customer support personnel from a mobile device, in accordance with one embodiment. In one study, the Inventors determined that approximately 38% of responses submitted by volunteers were less than 160 characters, which is the same character limitation of many text messaging devices. Therefore, identifying content of mobile-friendly questions (e.g., mobile device answerable questions) in real time, and customizing user interface elements based on the content is one technique disclosed herein for increasing the number of mobile device answerable questions that are reviewed and answered by responding users, e.g., customer support personnel, according to one embodiment.

At operation 501, the process begins.

At operation 503, the process receives, with a computing system, a question from a user, according to one embodiment. The users of the software system of operation 503 are provided the capability to submit questions regarding installation, implementation, use, and operation of the software system, in addition to substantive questions related to, for example, tax law, according to one embodiment. In one embodiment, one or more support personnel include paid support personnel in the employ of the provider of the software system and non-paid volunteer expert users of the software system. In one embodiment, the volunteer expert users of the software system are identified and certified by the provider of the software system in one or more subject matter areas of expertise. In one embodiment, questions submitted to the question and answer based customer support system can be related to very different product categories, be of various question types, and be formatted in various different ways. For example, some questions submitted to the question and answer based customer support system are product related questions, e.g., questions related to pricing, installation, version choice, etc. for the software systems that often have little or no relation to subject matter/job of the software system. On the other hand, some questions submitted to the question and answer based customer support system are subject matter related, or substantive, questions that are clearly related to the subject matter/content of the software system. In general, product related questions are best answered by paid support personnel in the employ of the provider of the software system, while subject matter related questions are often best answered by volunteer expert users of the software system. Consequently, in one embodiment, it is desirable to identify the broad category of questions, e.g., product related questions and subject matter related questions, and route subject matter related questions to the mobile question and answer queue if the questions satisfy other criteria for being mobile device answerable questions.

As a specific illustrative example, questions submitted to the question and answer based customer support system can be, but are not limited to: general knowledge/open-ended type questions, defined as "Who" type/format questions, "What" type/format questions, "When" type/format questions, "Where" type/format questions, "Why" type/format questions, and "How" type/format questions; rhetorical, or otherwise "unanswerable" questions; grammatically incorrect questions and/or queries; otherwise ill-formed questions; and/or closed-ended questions, capable of being answered with a simple "Yes" or "No", or via a multi-choice, or mapping. As discussed above, closed-ended questions that are partially or substantially categorized as subject matter related questions are deemed to be mobile device answerable questions and are routed to a mobile question and answer queue, according to one embodiment. Also as discussed above, general knowledge/open-ended type questions may also selectively be routed to the mobile question and answer queue, based on attributes, subject matter, and answer length for those questions, according to one embodiment.

At operation 505, the process analyzes the question with a question and answer customer support system, according to one embodiment. Analyzing includes determining one or more attributes of the question, and the question and answer customer support system is associated with a software system, according to one embodiment.

At operation 507, the process determines if the question is a mobile device answerable question, according to one embodiment. The question is a mobile device answerable question if the one or more attributes of the question satisfy one or more criteria to facilitate generating a response to the question from a mobile device by one or more support personnel, according to one embodiment.

At operation 509, the process configures multiple user interface elements, at least partially based on the one or more attributes of the question, to facilitate generating the response to the question, according to one embodiment.

At operation 511, the process provides the user interface elements with the question and answer customer support system for display in a user interface on the mobile device, according to one embodiment.

The operation 511 proceeds to operation 513, where the process ends, according to one embodiment.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein, are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "accessing," "analyzing," "obtaining," "identifying," "associating," "aggregating," "initiating," "collecting," "creating," "transferring," "storing," "searching," "comparing," "providing," "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or other device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A method for facilitating use of mobile devices to respond to questions submitted to a question and answer customer support system, to improve a rate of response to the questions by customer support personnel, the method comprising:

training, using a computing system, predictive models using historical question and answer data, the training resulting in at least one predictive model configured to estimate, based on a received question, an expected answer length, determine whether an answer to the question is likely to include a web link, and determine whether a question answerer is more likely than not to have to perform research in order to answer the question;

receiving, with a computing system having a processor and a memory, a first question from a user having a first type;

determining that the received question is a first type of question and forming and sending a response to the user with recommendations for the user to reform the question into a different type;

receiving a reformed first question from the user, the reformed question being the first question transformed into a second type of question;

analyzing, using the one or more predictive models, the reformed first question with a question and answer customer support system of the computing system by determining one or more attributes of the reformed first question and determining that the reformed first question is a mobile device answerable question, because one or more of the determined one or more attributes of the reformed first question satisfy one or more mobile device question criteria;

prioritizing, using the computing system, the answering of the reformed first question over the answering of questions that are not mobile device answerable questions;

configuring multiple user interface elements, at least partially based on the one or more attributes of the reformed first question by at least prepopulating the user interface elements to include at least one proposed answer to the reformed first question; and providing the user interface elements with the question and answer customer support system for display in a user interface on the mobile device of a first question answerer.

2. The method of claim 1, wherein the first question answerer is an expert user of the question and answer customer support system.

3. The method of claim 2, wherein first question answerer is a volunteer who does not receive payment from a service provider that provides the question and answer customer support system.

4. The method of claim 1, wherein the attributes of the question include one or more of subject matter, type, format, predicted length of the response to the question, and potential responses for the question.

5. The method of claim 4, wherein the subject matter of the question includes one or more of content related to the software system and content related to filing tax returns,
wherein the type of the question includes one of an open-ended question and a closed-ended question,
wherein the format of the question includes one of a binary choice, a multiple choice, a factoid, and an open-ended response.

6. The method of claim 4, wherein the attributes of the question include whether the response to the question is predicted to include a web link and whether the response to the question is predicted to involve research by the one or more support personnel.

7. The method of claim 1, wherein configuring the multiple user interface elements includes pre-populating response buttons within the user interface with potential answers to the question to enable the one or more support personnel to generate the response by selecting one or more of the response buttons.

8. The method of claim 1, wherein the one or more criteria include:
the response to the question being predicted, by the question and answer customer support system, to be under a predetermined length;
the response to the question being predicted, by the question and answer customer support system, to not include a web link; and
the response to the question being predicted, by the question and answer customer support system, to not include research by the one or more support personnel formulating the response.

9. The method of claim 8 wherein the predetermined length is 160 characters.

10. The method of claim 1, wherein the question and answer customer support system is a component of a software system selected from a group of software systems consisting of:
a computing system implemented tax preparation software system;
a network accessed tax preparation software system;
a web-based tax preparation software system;
a cloud-based tax preparation software system;
a computing system implemented business management software system;
a network accessed business management software system;
a web-based business management software system;
a cloud-based business management software system;
a computing system implemented accounting software system;
a network accessed accounting software system;
a web-based accounting software system;
a cloud-based accounting software system;
a computing system implemented financial management system;
a network accessed financial management system;
a web-based financial management system; and
a cloud-based financial management system.

11. The method of claim 1, wherein the question and answer based customer support system includes a web-based question and answer forum associated with at least one of the software system and an area of endeavor of the software system.

12. The method of claim 1, wherein the question and answer based customer support system includes a customer support question and answer database, the customer support question and answer database including question and answer data representing one or more questions submitted by asking users of the software system and the answers to those questions provided by the one or more support personnel, wherein the question and answer data in the customer support question and answer database can be searched and accessed by searching users of the software system.

13. The method of claim 1 wherein determining that the reformed first question is a mobile device answerable question includes searching the question for "Who" question formats, "What" question formats, "When" question formats, "Where" question formats, and "How" question formats to predict a length of the response to the question.

14. The method of claim 1 further comprising:
training a predictive model with one or more of:
user historical data associated with interactions between one or more users and the question and answer customer support system;
user profile data associated with user interaction with the software system; and
feedback data received in response to the one or more support personnel reviewing questions from the question and answer based customer support system.

15. The method of claim 1, wherein the question and answer customer support system delivers the user interface elements to the mobile device to enable the mobile device to integrate the user interface elements into a mobile user interface provided to the user with a mobile application.

16. The method of claim 15, wherein the mobile application is one of a mobile web browser and a native mobile application.

17. A system for facilitating use of mobile devices to respond to questions submitted to a question and answer customer support system, to reduced unanswered questions maintained in the question and answer customer support system, the system comprising:
at least one processor; and
at least one memory coupled to the at least one processor, the at least one memory having stored therein instructions which, when executed by any set of the one or more processors, perform:
training, using a computing system, predictive models using historical question and answer data, the training resulting in at least one predictive model configured to estimate, based on a received question, an expected answer length, determine whether an answer to the question is likely to include a web link, and determine whether a question answerer is more likely than not to have to perform research in order to answer the question;
receiving, with a computing system having a processor and a memory, a first question from a user having a first type;

determining that the received question is a first type of question and forming and sending a response to the user with recommendations for the user to reform the question into a different type;

receiving a reformed first question from the user, the reformed question being the first question transformed into a second type of question;

analyzing, using the one or more predictive models, the reformed first question with a question and answer customer support system of the computing system by determining one or more attributes of the reformed first question and determining that the reformed first question is a mobile device answerable question, because one or more of the determined one or more attributes of the reformed first question satisfy one or more mobile device question criteria;

prioritizing, using the computing system, the answering of the reformed first question over the answering of questions that are not mobile device answerable questions;

configuring multiple user interface elements, at least partially based on the one or more attributes of the reformed first question by at least prepopulating the user interface elements to include at least one proposed answer to the reformed first question; and providing the user interface elements with the question and answer customer support system for display in a user interface on the mobile device of a first question answerer.

18. The system of claim 17, wherein the first question answerer is an expert user of the question and answer customer support system and is a volunteer.

19. The system of claim 17, wherein the attributes of the question include one or more of subject matter, type, format, predicted length of the response to the question, and potential responses for the question.

20. The system of claim 19, wherein the subject matter of the question includes one or more of content related to the software system and content related to filing tax returns, wherein the type of the question includes one of an open-ended question and a closed-ended question, wherein the format of the question includes one of a binary choice, a multiple choice, a factoid, and an open-ended response.

21. The system of claim 19, wherein the attributes of the question include whether the response to the question is predicted to include a web link and whether the response to the question is predicted to involve research by the one or more support personnel.

22. The system of claim 17, wherein configuring the multiple user interface elements includes pre-populating response buttons within the user interface with potential answers to the question to enable the one or more support personnel to generate the response by selecting one or more of the response buttons.

23. The system of claim 17, wherein the one or more criteria include:

the response to the question being predicted, by the question and answer customer support system, to be under a predetermined length;

the response to the question being predicted, by the question and answer customer support system, to not include a web link; and the response to the question being predicted, by the question and answer customer support system, to not include research by the one or more support personnel formulating the response.

24. The system of claim 23 wherein the predetermined length is 160 characters.

25. The system of claim 17, wherein the question and answer customer support system is a component of a software system selected from a group of software systems consisting of:

a computing system implemented tax preparation software system;

a network accessed tax preparation software system;

a web-based tax preparation software system;

a cloud-based tax preparation software system;

a computing system implemented business management software system;

a network accessed business management software system;

a web-based business management software system;

a cloud-based business management software system;

a computing system implemented accounting software system;

a network accessed accounting software system;

a web-based accounting software system;

a cloud-based accounting software system;

a computing system implemented financial management system;

a network accessed financial management system;

a web-based financial management system; and a cloud-based financial management system.

26. The system of claim 17, wherein determining that the reformed first question is a mobile device answerable question includes searching the question for "Who" question formats, "What" question formats, "When" question formats, "Where" question formats, and "How" question formats to predict a length of the response to the question.

27. The system of claim 17, further comprising:

training the predictive model with one or more of:

user historical data associated with interactions between one or more users and the question and answer customer support system;

user profile data associated with user interaction with the software system; and feedback data received in response to the one or more support personnel reviewing questions from the question and answer based customer support system.

28. The system of claim 17, wherein the question and answer customer support system delivers the user interface elements to the mobile device to enable the mobile device to integrate the user interface elements into a mobile user interface provided to the user with a mobile application.

* * * * *